United States Patent [19]

Matumura

[11] 4,284,016
[45] Aug. 18, 1981

[54] MULTIPLE PATTERN SEWING MACHINE

[75] Inventor: Nobuyoshi Matumura, Yao, Japan

[73] Assignee: Maruzen Sewing Machine Co., Ltd., Osaka, Japan

[21] Appl. No.: 65,518

[22] Filed: Aug. 10, 1979

Related U.S. Application Data

[63] Continuation-in-part of Ser. No. 948,158, Oct. 3, 1978, abandoned, which is a continuation-in-part of Ser. No. 913,592, Jun. 8, 1978, abandoned.

[30] Foreign Application Priority Data

Jun. 27, 1977 [JP] Japan ............................ 52-76896
Oct. 12, 1977 [JP] Japan ............................ 52-122719
Oct. 12, 1977 [JP] Japan ............................ 52-122720

[51] Int. Cl.³ ............................................. D05B 3/02
[52] U.S. Cl. ................................................ 112/158 E
[58] Field of Search .......... 112/158 E, 121.12, 121.11; 318/567, 569

[56] References Cited

U.S. PATENT DOCUMENTS

| | | | |
|---|---|---|---|
| 3,984,745 | 10/1976 | Minalga | 112/158 E X |
| 4,016,821 | 4/1977 | Minalga | 112/158 E |
| 4,182,249 | 1/1980 | Matumura etal. | 112/158 E X |

FOREIGN PATENT DOCUMENTS 2702488 7/1977 Fed. Rep. of Germany ....... 112/158 E

*Primary Examiner*—Peter P. Nerbun
*Attorney, Agent, or Firm*—Fitch, Even, Tabin, Flannery & Welsh

[57] ABSTRACT

A control apparatus for a multiple pattern sewing machine. Included in the sewing machine are a means for controlling the displacement of a feed mechanism for feeding a cloth and a means for controlling the displacement of a bight mechanism for swinging a sewing needle in the direction crossing the cloth feeding direction. A plurality of switching devices are provided for selectively coupling to the feed control means a plurality of different amplitude reference signals for controlling the feed mechanism. A plurality of switching devices are provided for selectively coupling to the bight control means a plurality of different amplitude reference signals for controlling the bight mechanism. Counter means, which are responsive to a timing signal generated for each stitch in the pattern, are provided for making a stepping operation for selectively rendering conductive the switching devices of the feed switching means and the bight switching means for each stepping operation.

23 Claims, 20 Drawing Figures

BIGHT

FEED

| STITCH | BIGHT POSITION | FEED AMOUNT |
|---|---|---|
| 1 | 1 | 0 |
| 2 | 1 | +2 |
| 3 | 3 | 0 |
| 4 | 3 | -1 |
| 5 | 5 | 0 |
| 6 | 5 | +2 |

| STITCH | BIGHT POSITION | FEED AMOUNT |
|---|---|---|
| 1 | 4 | 1 |
| 2 | 4 | 1 |
| 3 | 7 | 1 |
| 4 | 4 | 1 |
| 5 | 4 | 1 |
| 6 | 1 | 1 |
| 7 | 4 | 1 |

MULTIPLE PATTERN SEWING MACHINE

CROSS-REFERENCE TO RELATED APPLICATION

This application is a continuation-in-part of my copending application, Ser. No. 948,158, filed Oct. 3, 1978, now abandoned, which, in turn, is a continuation-in-part of my application Ser. No. 913,592, filed June 8, 1978, now abandoned.

BACKGROUND OF THE INVENTION

1. Field of the Invention:

The present invention relates to multiple pattern sewing machines and more particularly to a multiple pattern sewing machine wherein the feed amount of cloth and/or the stitch width amplitude are controlled by electronic means.

2. Description of the Prior Art:

Sewing machines have been provided with mechanisms for providing different patterns of stitches in cloth. Normally, each of the different patterns includes a plurality of stitches which may extend various distances laterally and along the feed path and the pattern is repeated after a predetermined number of stitches. Such stitch patterns are obtained by positioning the needle for each stroke thereof at a predetermined position on the cloth (positional coordinates), that is the sewing needle is moved sideways a predetermined distance (stitch width or bight) and the cloth is fed forward or backward a predetermined amount between strokes of the needle. Thus, each stitch pattern comprises a series of positional coordinates for the sewing needle. The required series of positional coordinates for a selected stitch pattern are contained in a memory apparatus in the sewing machine, which memory apparatus is read out upon command and the read out is applied to the feed and bight movement apparatus.

The memory apparatus may be mechanical or electronic. Prior art mechanical memory apparatus normally included cams which were shaped to provide the desired series of positional coordinates. Electronic memories have included a digital type for storage of the series of positional coordinates.

There are many disadvantages to using digital memories for storage of the positional coordinates. The bight and feed movement apparatus are operated by analog signals. The desired analog signals must be converted to digital form for storage, readout digitally and then reconverted to analog form for use. This required a large number of integrated digital circuits which increased the cost of the sewing machine.

SUMMARY OF THE INVENTION

According to the present invention, an analog memory apparatus is provided for storing the positional coordinates for a multiple pattern sewing machine. The machine includes a feed mechanism and a bight or stitch width mechanism controlled by a feed control signal and a bight control signal, respectively. A predetermined feed control signal is selected by actuating a switching means which is coupled to one of a plurality of different amplitude reference signals. Likewise, a predetermined bight control signal is selected by actuating a switching means which is coupled to one of a plurality of different amplitude reference signals. The switching means are actuated in an order in accordance with the desired pattern.

Accordingly, a principal object of the present invention is to provide a multiple pattern sewing machine, wherein the feed amount and the bight position are controlled by an analog memory apparatus.

Another object of the present invention is to provide a multiple pattern sewing machine, wherein an electronic control of the feed amount and the bight position is achieved with a simplified structure.

A further object of the present invention is to provide a multiple pattern sewing machine, wherein an electronic control of the feed amount and the bight position is achieved in a stabilized operation.

Still another object of the present invention is to provide a multiple pattern sewing machine, wherein an electronic control of the feed amount and the bight position is achieved with an inexpensive implementation.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
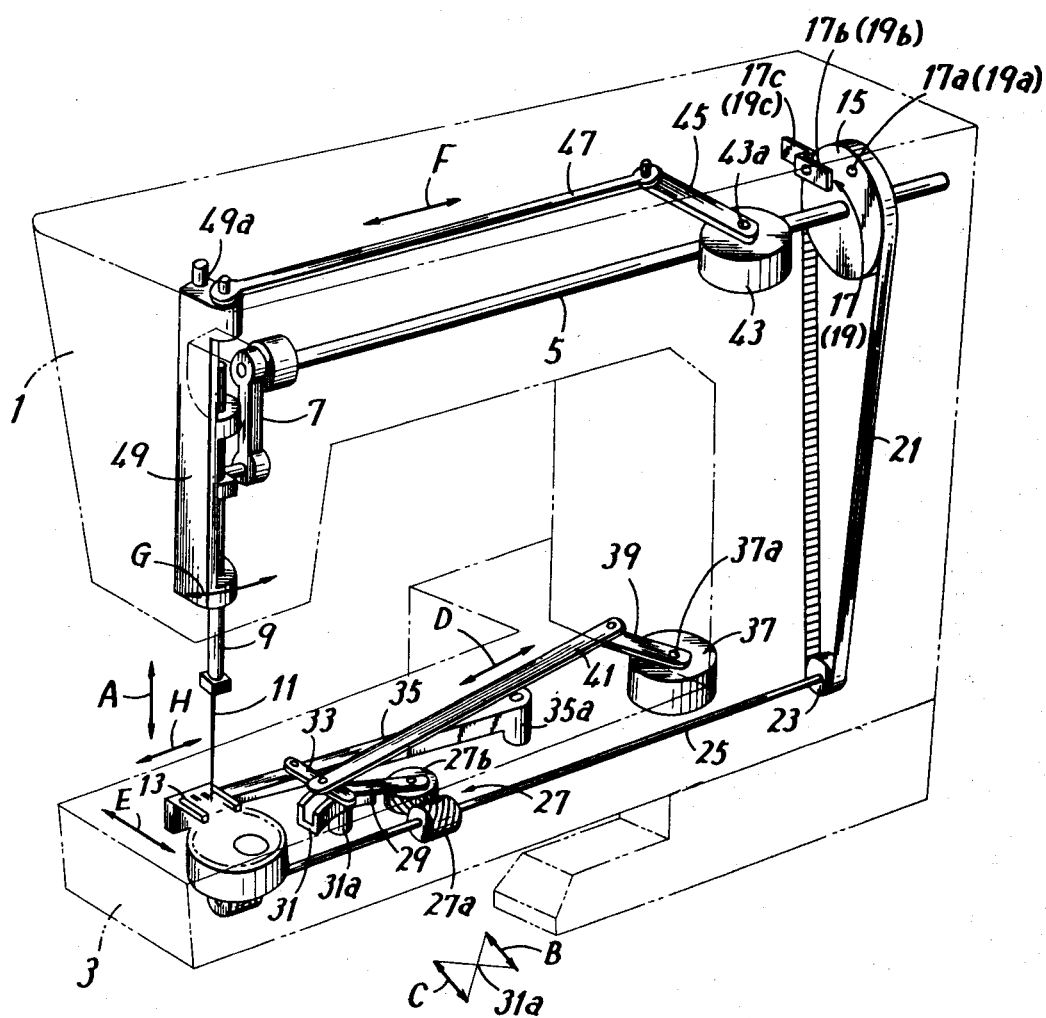
FIG. 1 is a view showing the major portion of a multiple pattern sewing machine embodying the present invention.

FIG. 1 is a mechanism diagram showing the major portion of a multiple pattern sewing machine to which the present invention is applied. Below a sewing machine bed 3 or inside a bracket arm 1, a driving motor (not shown) is installed. The rotation of this driving motor is transmitted, at a certain speed reduction ratio, to a main shaft or upper shaft 5 inside the bracket arm 1. As known in the art, the upper shaft 5 is connected to the various mechanism of the sewing machine.

Connected to the upper shaft 5 is a crank mechanism 7 for reciprocating a needle bar 9 and hence a sewing needle 11 in the direction of arrow A. At the position of the sewing needle 11 on the bed 3, a feed dog 13 for cloth feed is disposed so that it can be displaced in the direction of an arrow E.

Installed inside the bed 3 is a lower shaft 25 for driving the feed dog 13. A timing pulley 15 integrally rotatably fixed on the upper shaft 5 and a timing pulley 23 integrally rotatably fixed on the lower shaft 25 are interconnected by a timing belt 21. Therefore, as the upper shaft 5 is rotated, the lower shaft 25 is rotated, e.g., with double the rpm of the upper shaft. A gear wheel 27a, which is one of a pair of spiral gears 27, is integrally rotatably fixed on the lower shaft 25. The other gear wheel 27b in the pair 27 is rotatably supported on a rotary shaft (not shown) inside the bed 3. Therefore the rotation of the lower shaft 25 causes the rotation of the gear wheel 27b. At an eccentric position on the upper surface of the gear wheel 27b, one end of a connecting lever 29 is pivoted by a pin. The other end of the connecting lever 29 is rotatably fixed to one end of a feed regulator 31.

The feed regulator 31 is curved in an arc and pivotally supported by a shaft 31a disposed at the middle of the curve. The regulator 31 has a U-shaped guide groove in which is slidably inserted a slide block (not shown) downwardly projecting from the lower surface of a slide plate 33. The other end of the slide plate 33 is attached to a feed bar 35 which is rotatably connected at one end 35a thereof to the bed 3 and fixed at the other end to the feed dog 13. The middle point of the slide plate 33 is attached to one end of a connecting lever 41. A connecting arm 39 is fixed at one end thereof on the rotary shaft 37a of a direct current motor 37, and the other end of the connecting lever 41 is pivotally connected to the other end of the connecting arm 39. The direct current motor 37 serves as a feed control motor.

On the other hand, the bracket arm 1 contains a direct current motor 42 for bight control. Fixed to the rotary shaft 43a of the direct current motor 43 is one end of a connecting arm 45, the other end of which is pivotally connected to one end of a connecting lever 47. The other end of the connecting lever 47 is pivotally connected to a needle bar support 49 which is supported by a shaft 49a so as to be swingable in the direction of an arrow G. The movement of the needle bar support 49 causes the needle bar 9 to be oscillated generally in the direction of an arrow H.

The operation of the arrangement constructed in the manner described above will now be outlined to the extent needed for the understanding of the present invention.

First of all, the power is turned on. In response thereto, the driving motor is energized to rotate the upper shaft 5. The rotation of the upper shaft 5 is converted into a linear reciprocating motion by the crank mechanism 7, so that the needle bar 9 and hence the sewing needle 11 are reciprocated in the direction of an arrow A between the upper and lower dead points. The rotation of the upper shaft 5 causes the rotation of the timing pulley 15, which is transmitted to the timing pulley 23 by the timing belt 21, whereby the lower shaft 25 is driven for rotation. As a result, the gear wheel 27b in the pair of spiral gears 27 is rotated, whereby the connecting lever 29 pivotally connected thereto, i.e. the feed regulator 31, is swung in the directions of arrows B and C around the axis of the shaft 31a. In this case, the amplitude of the swing motion of the feed regulator 31 increases as the opposite ends of the swing box are approached. It does not swing at all at the swing center. Therefore, what position the slide plate 33 occupies in the feed regulator 31 determines the amount of displacement of the feed bar 35, i.e., of the feed dog 13 in the direction of an arrow E. If, therefore, the amount of rotation of the direct current motor 37 is controlled to displace the connecting lever 41 in the direction of an arrow D, then the amount of displacement of the feed dog 13, i.e., the amount of cloth feed, is controlled. In this case, if the slide plate 33 is positioned on the right side (the arrow B side), the feed is forward, while if it is positioned on the left side (the arrow C side), the feed is backward.

Further, the direct current motor 43 is rotated through a certain angle, whereby the connecting lever 47 is moved in the direction of an arrow F and the needle bar support 49 is swung in the direction of an arrow G. Therefore, the sewing needle 11 is swung in the direction of an arrow H, thereby achieving the so-called zigzag sewing. The amplitude (bight) of the sewing needle 11 is controlled by controlling the angle of rotation of the direct current motor 43.

Therefore, in this embodiment, by controlling the angles of rotation of the direct current motors 37 and 43 according to a coordinate position of a pattern to be sewn, the feed (arrow E) and bight (arrow H) are controlled.

Although the direct current motors 37 and 43 for making an arcuate motion are employed in the FIG. 1 embodiment, alternatively linear type direct current motors for making a linear motion may be employed to control the position of the connecting levers 47 and 41 to adjust the amplitude and the feed amount.

The pulley 15 comprises a magnet 17a (19a) which is partially embedded on the side surface of the pulley 15. A proximity switch 17b (19b), such as a Hall effect device, a lead switch, or the like, is installed on a bracket 17c (19c) fixed on the arm 1, and in association with the magnet 17a (19a). Accordingly, the proximity switch 17b (19b) serves to generate one pulse per revolution of the above described shaft 5, i.e. one pulse per each downward movement of the needle 11. A bight pulse generator 17 (FIG. 2) and a feed pulse generator 19 are thus implemented. It is pointed out that since the bight pulse generator 17 and a feed pulse generator 19 may be of any type that generates one timing pulse per each downward movement of the needle any other types such as photoelectric switch, a microswitch or the like may be utilized. Meanwhile, the bight pulse generator 17 is preferably structured such that one pulse is obtained in the course of the movement of the needle 11 about the upper dead point and the feed pulse generator 19 is preferably structured such that one pulse is obtained in the course of the movement of the needle 11 from its middle point to the upper dead point. Alternatively, the bight pulse generator 17 and the feed pulse generator 19 can be shared by delaying the output of either the bight pulse generator 17 or the feed pulse generator 19 to provide a pseudo output of the other.

Figure 2:
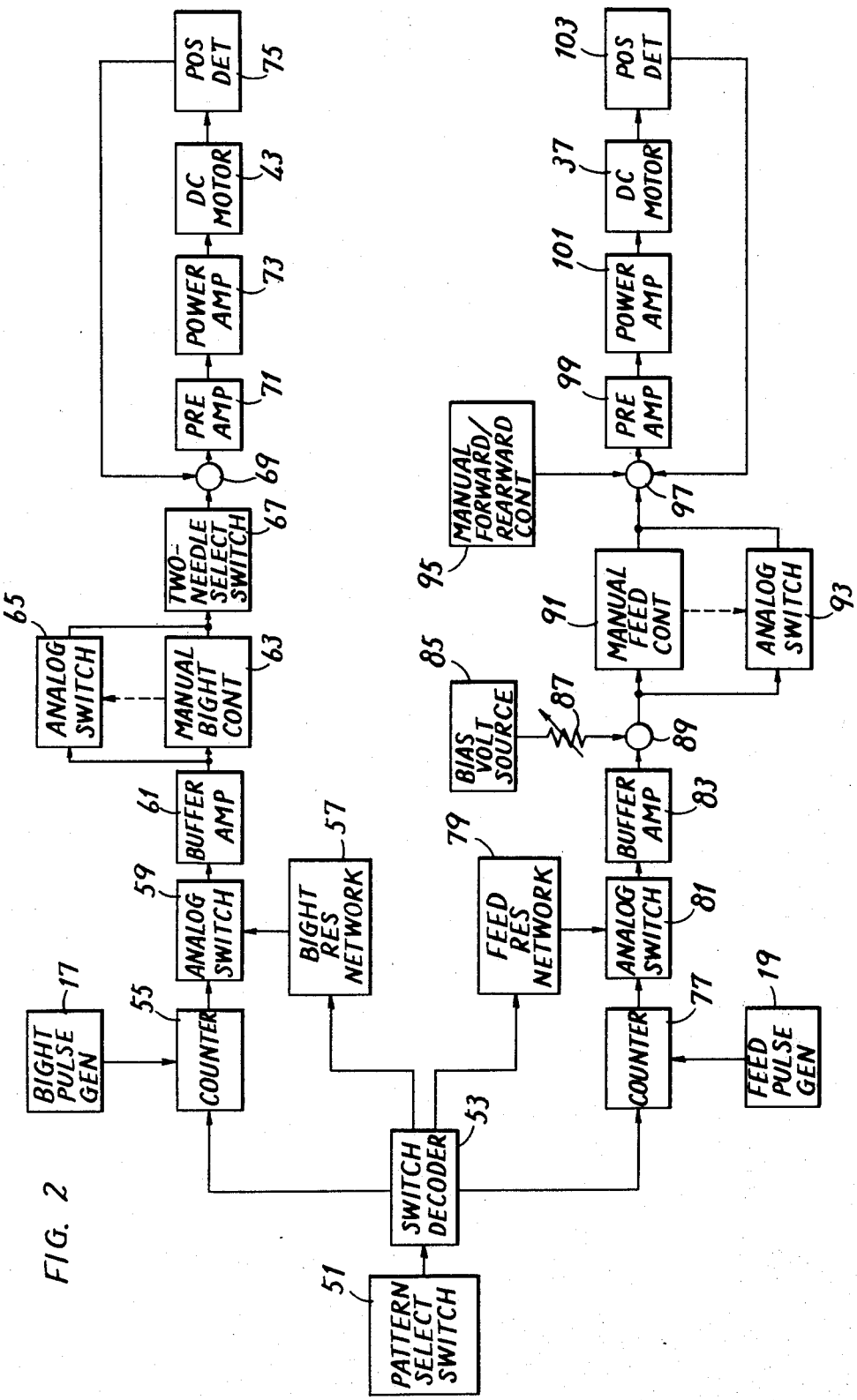
FIG. 2 is a block diagram of one embodiment of the present invention.
Figure 9:
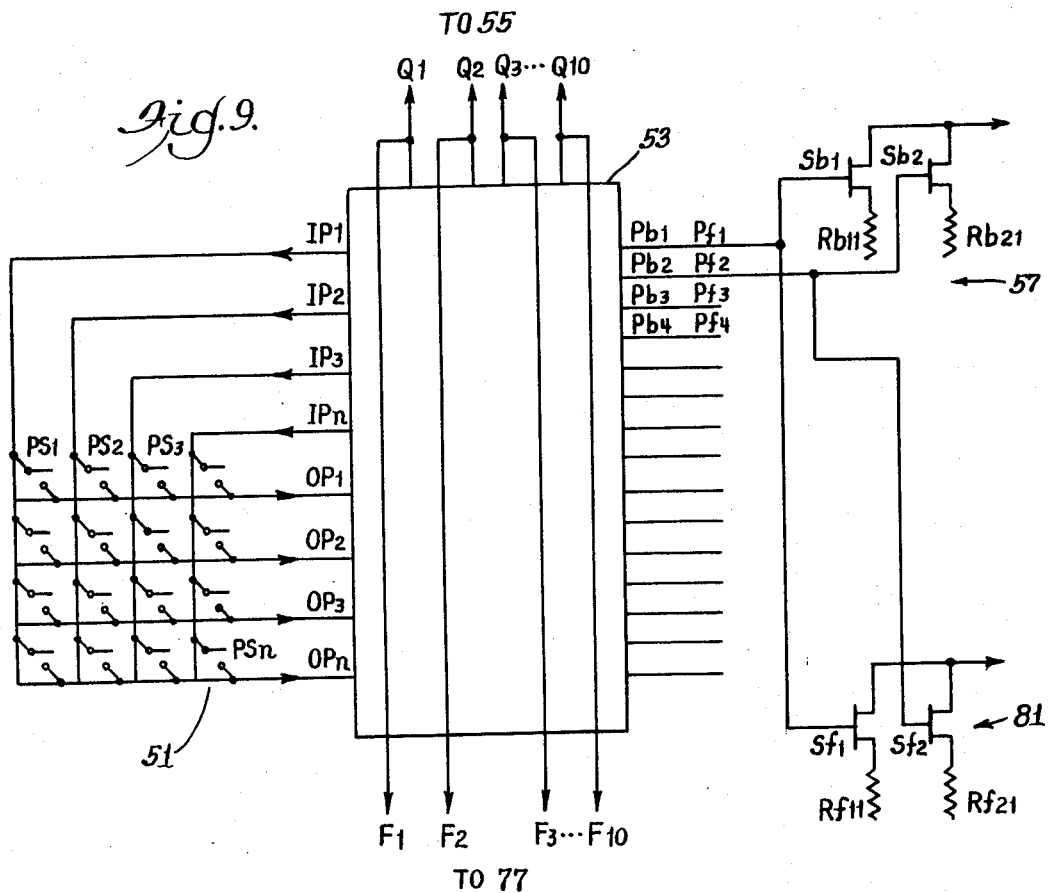
FIG. 9 is a schematic diagram of a portion of FIG. 3A showing the keyboard and switch decoder in greater detail.

FIG. 2 shows a block diagram of one embodiment of the present invention. The embodiment is shown comprising a pattern selecting switch 51 for the purpose of sewing a plurality of kinds of patterns. The pattern selecting switch 51 comprises a keyboard matrix, which, as shown in FIG. 9, comprises a plurality of key switches $PS_1$ through $PS_n$ associated with the patterns $P_1$ through $P_n$, respectively. By closing a desired key switch associated with a pattern to be sewn, an associated pattern selecting signal is obtained by completing a circuit between an output terminal $OP_1$ through $OP_4$ and an input terminal $IP_1$ through $IP_4$ of a switch decoder 53. The switch decoder 53 may include binary coded circuits, such as AND circuits, NAND circuits, etc., which serve to decode the pattern selecting signal from the pattern selecting switch 51 and provide two selection signals, one for the bight and one for feed of the pattern selected. The switch decoder 53 continues to provide the same pattern selection signals after a given pattern is selected until a different pattern is selected or a power supply switch is turned off. The bight selection signal and the feed selection signal from the switch decoder 53 are applied respectively to a bight resistance network 57 and a feed resistance network 79.

The switch decoder 53 also provides a signal representative of the number of stitches of the pattern selected based on the selecting signal and this signal is applied, as shown in FIG. 9, to the counter 55 by means of one of a plurality of connections $Q_1$ through $Q_{10}$ and to counter 77 by one of a plurality of connections $F_1$ through $F_{10}$ to preset the same.

The counters 55 and 77 are adapted to count in response to the bight pulse and the feed pulse, respectively, obtainable from the corresponding bight pulse generator 17 and the feed pulse generator 19, respectively, and provide a separate output from each counter for each count value. When the counters 55 and 77 count to a number equal to the number of stitches as preset by the switch decoder 53, the counters 55 and 77 are returned to the initial state, whereupon a new count is started. In this connection, the individual outputs $Q_1$–$Q_{10}$ of the counter 55 and the signal $Q_1$–$Q_{10}$ of the switch decoder 53 are applied to a binary coded circuit (not shown) the output of which is connected to the reset of the counter. Likewise, the individual outputs $F_1$–$F_{10}$ of the counter 77 and the signal $F_1$–$F_{10}$ of the switch decoder 53 are applied to a binary coded circuit (not shown) the output of which is connected to the reset of the counter 77.

Generally, the bight resistance network 57 and the feed resistance network 79 each comprises a group of voltage dividers each including a plurality of series connected resistors. One voltage divider is provided for each pattern and is adapted to be supplied with a supply voltage across its end terminals such that a voltage corresponding to a coordinate position for each stitch in the pattern is obtained through resistance division of the supply voltage.

As shown in FIG. 2, the outputs from the counters 55 and 77 are applied to analog switches 59 and 81, respectively. Each of the analog switches 59 and 81 comprises a plurality of switching devices corresponding in number to the number of needle strokes in one cycle of the pattern, the switching devices being turned on in order by the count value outputs of the associated counter 55, 79. Accordingly, for each count of the counter 55, the analog switch 59 provides an output voltage, obtained from the bight resistance network 57, corresponding to a bight voltage associated with the coordinate position of one stitch of the selected pattern. Similarly, for each count of the counter 77, the analog switch 81 provides an output voltage, obtained from the feed resistance network 79, corresponding to the voltage associated with the feed amount (incremental) for one stitch of the selected pattern.

The bight voltage from the analog switch 59 is applied through a buffer amplifier 61 to a manual bight control circuit 63 and an analog switch 65. The output voltage from the analog switch 81 is applied through a buffer amplifier 83 to an adder 89. The adder 89 serves to add the output voltage from the buffer amplifier 83 and the voltage obtained through a variable resistor 87 from a bias voltage source 85 to provide an output or feed voltage to a manual feed control circuit 91 and an analog switch 93. Analog switches 65 and 93 are conduction controlled by the control circuits 63 and 91, respectively, whereby a bight voltage and a feed voltage, as adjusted, are obtained.

Figure 10:
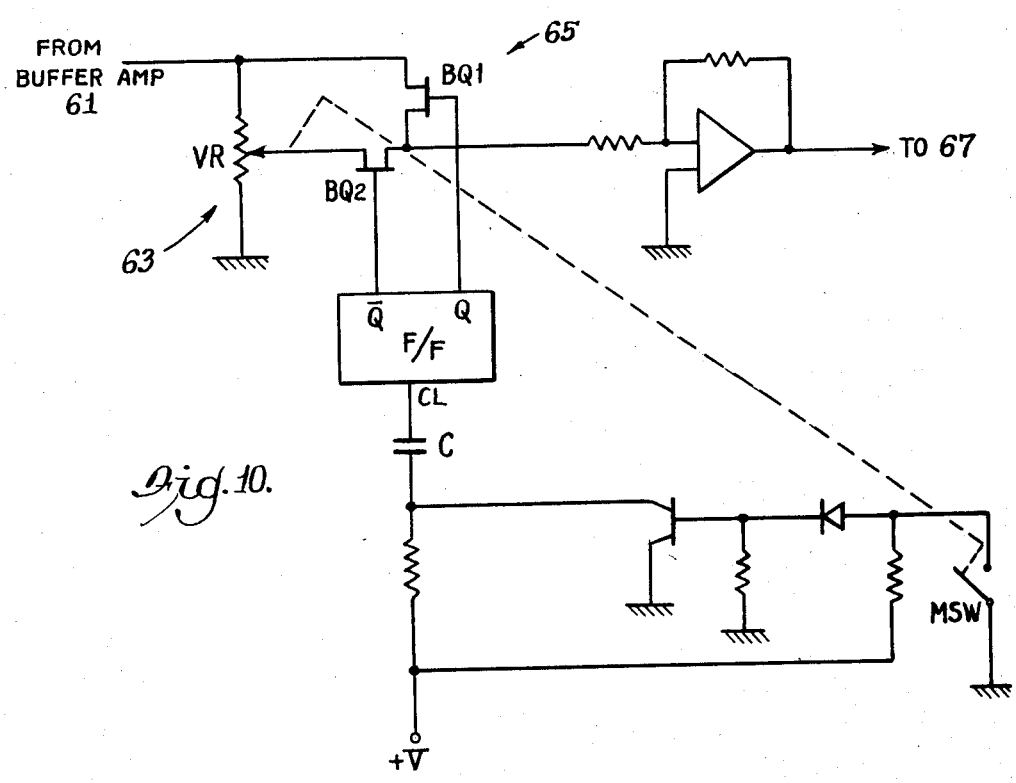
FIG. 10 is a schematic diagram of a portion of FIG. 2 showing the analog switch and the manual bight control in greater detail.
Figure 11:
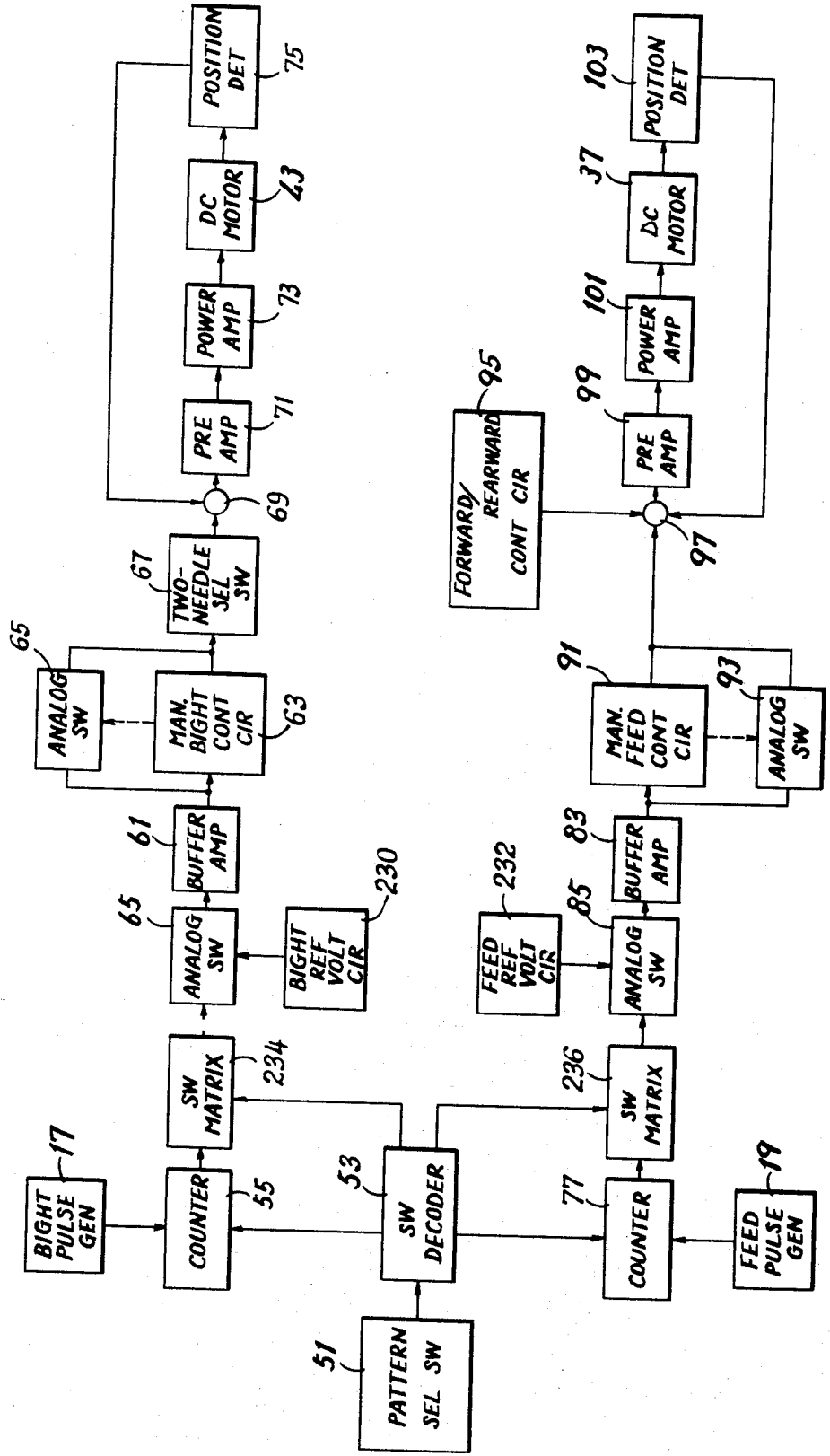
FIG. 11 is a block diagram of still another embodiment of the present invention.

A circuit which may be employed for the manual bight control circuit 63 and the analog switch 65 and for the manual feed control 91 and analog switch 91 is shown in FIG. 10. Initial operation of the manual control VR causes the manual switch MSW to close which, in turn, causes a clock pulse to be fed to the flip flop causing it to switch states. This change of state causes the field effect transistor $BQ_2$ to conduct, thereby providing the operator with manual control of the bight or feed. Moving the manual control to its off position, opens the switch MSW, causing the flip flop to switch states and turn on field effect transistor $BQ_1$. The manual control is thus bypassed.

The bight voltage from the analog switch 65 is selectively switched by means of a two-needle selection switch 67 and is applied to an adder 69, which is the input of a bight servo-mechanism for controlling the displacement of the bight mechanism. The two-needle selection switch 67 is provided to reduce the bight voltage and thus change the bight width for preventing the needle from colliding with a needle plate. The feed voltage as adjusted from the analog switch 93 is applied to an adder 97, which is the input of a feed servo mechanism for controlling the displacement of the feed mechanism. The feed adder 97 is supplied with a control voltage from a manual forward/rearward control circuit 95. The forward/rearward control circuit 95 provides a manual control to coincide the forward stitch pitch and the rearward stitch pitch of a button hole, automatic reverse stitch pattern, and the like.

The adder 69 receives a feed back voltage from a position detector 75, which indicates the position of the direct current motor 43, and adds the bight voltage from the above described two-needle selecting switch 67 and the above described feed back voltage to provide an output to a pre-amplifier 71. The output of the pre-amplifier 71 is coupled to a power amplifier which, in turn, drives the direct current motor 43. Similarly, the adder 97 adds the feedback voltage from a position detector 103, which indicates the position of the direct current motor 37, the feedback voltage from the analog switch 93 and the control voltage from the above described forward/rearward control circuit 95, to provide an output to a preamplifier 99. The output of the preamplifier 99 is coupled to a power amplifier 101 which, in turn, drives the direct current motor 37.

Figure 3A:
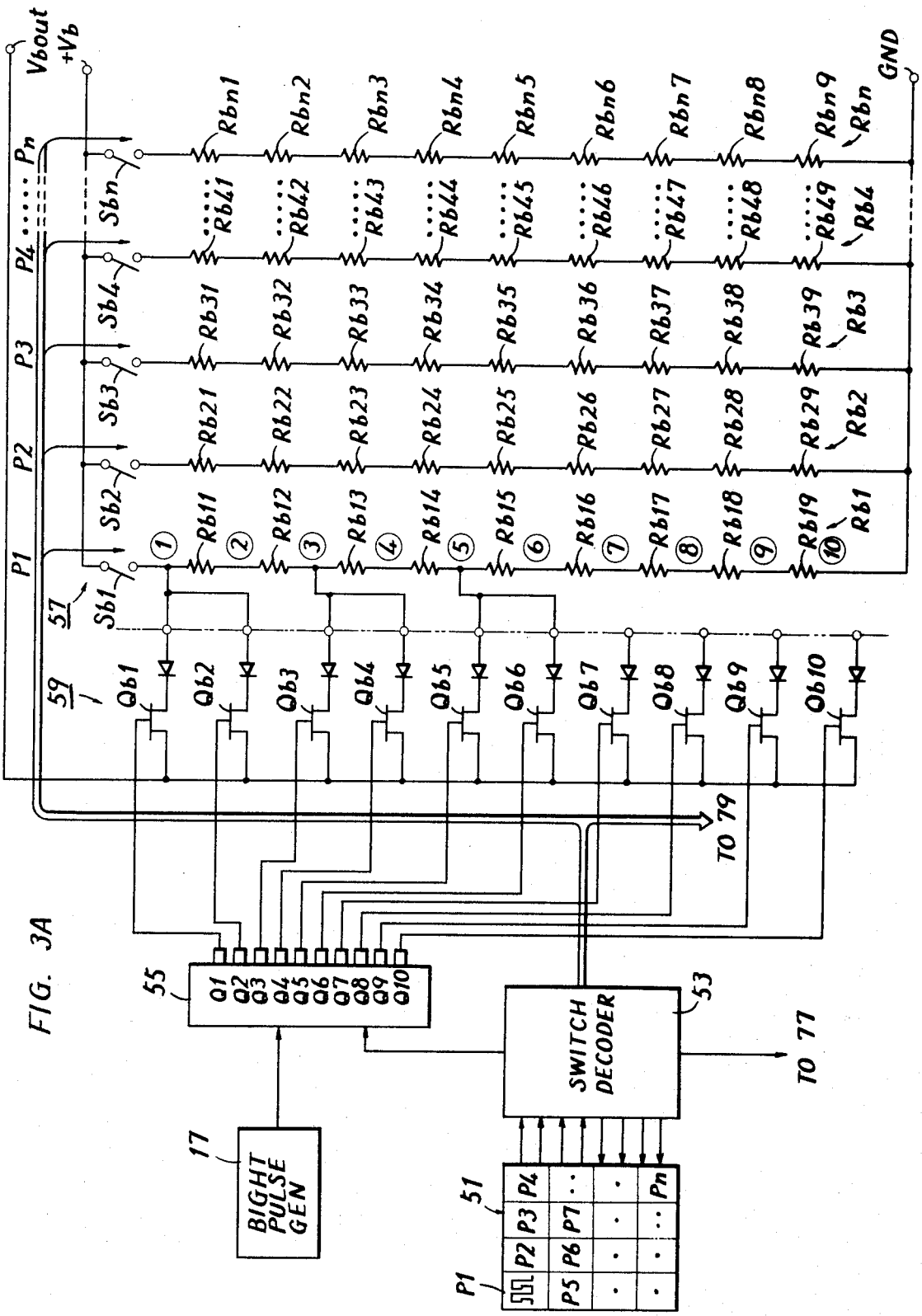
FIGS. 3A and 3B show a schematic diagram of the major portion of the FIG. 2 embodiment.
Figure 3B:
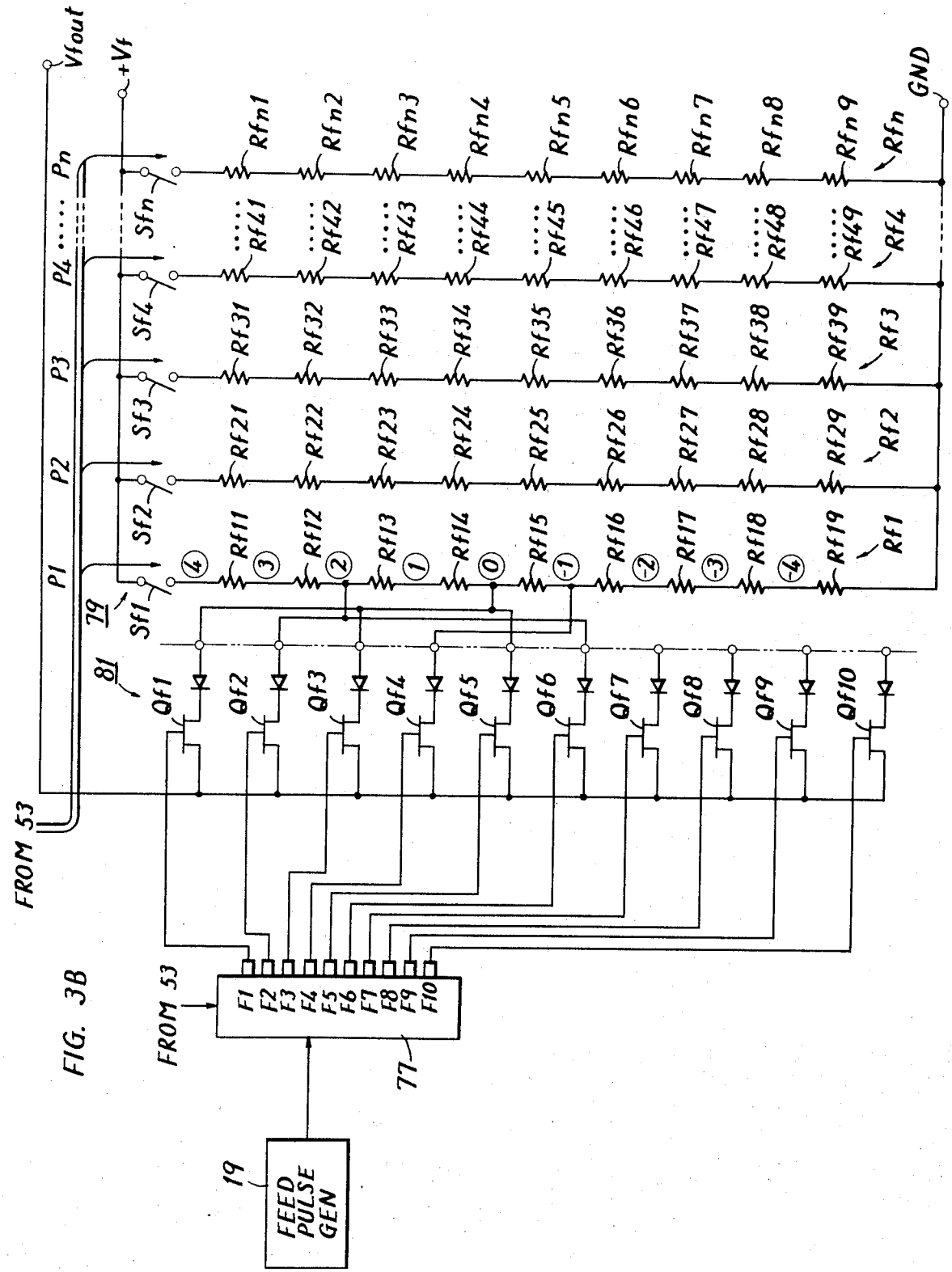

FIG. 3A depicts in particular detail the bight resistance network 57, the analog switch 59 and the counter 55 shown in FIG. 2. FIG. 3B similarly shows in detail the feed resistance network 79, the analog switch 81 and the counter 77. The bight resistance network 57 and the feed resistance network 79 are similar in construction. Therefore, the bight resistance network 57 shown in FIG. 3A is only described in detail.

The bight resistance network 57 comprises a plurality (n) of voltage divider circuits Rb1 through Rbn, one associated with each kind of pattern that can be selected by means of the pattern selection switch 51. The voltage divider circuit Rb1 comprises nine series connected resistors Rb11 through Rb19 for providing ten voltage drops or steps. Similarly, the voltage divider circuit Rb2 also comprises nine series connected resistors Rb21 through Rb29. Similarly, the voltage divider circuit Rbn comprises nine series connected resistors Rbn1 through Rbn9. The number and the resistance value of the resistors in each of these voltage divider circuits Rb1 through Rbn is determined by the number of coordinate positions included in one cycle of the pattern associated with that voltage divider circuit. The upper ends of the voltage divider circuits Rb1 through Rbn are connected through respective switches Sb1 through Sbn to a voltage source +Vb. The lower ends of the voltage divider circuits Rb1 through Rbn are connected to the ground. The switches Sb1 through Sbn may be field effect transistors that are selectively rendered conductive in response to selection of a pattern on the pattern selection switch 51, i.e. the pattern selecting signal from the pattern selection switch 51 causes the switch decoder 53 to produce the pattern selection representing signal that turns on the switch Sb1 through Sbn associated with the selected pattern.

The analog switch 59 comprises ten field effect transistors Qb1 through Qb10 each serving as a switching device. The number of switching devices included in the analog switch 59 is determined by the maximum number of stitches included in one cycle of any pattern provided in the pattern selection switch. However, for any particular pattern, the number of switching devices Qb1 through Qb10, connected to taps on the associated voltage divider circuit is equal to the number of stitches included in one cycle of that pattern.

The gate electrode or the control electrode of each of the switching devices Qb1 through Qb10 is individually connected to each of the output terminals Q1 through Q10 of the counter 55, respectively. Accordingly, the switching devices Qb1 through Qb10 are individually turned on by respective outputs Q1 through Q10 of the counter 55. The drain electrodes or the output electrodes of these switching devices Qb1 through Qb10 are connected to a common bight voltage output terminal Vbout. The source electrodes or the input electrodes of the switching devices Qb1 through Qb10 are connected to the proper taps of the respective voltage divider circuits Rb1 through Rbn. The proper tap connection for a switching device is determined by the amount of bight movement required for the particular stitch associated with that switching device. For example, the first switching device, which is connected to tap 1 of voltage divider circuit Rb1 may be connected to tap 2 of voltage divider circuit Rb2, to tap 4 of voltage divider circuit Rb3, etc.

Figures 4A, 4B:
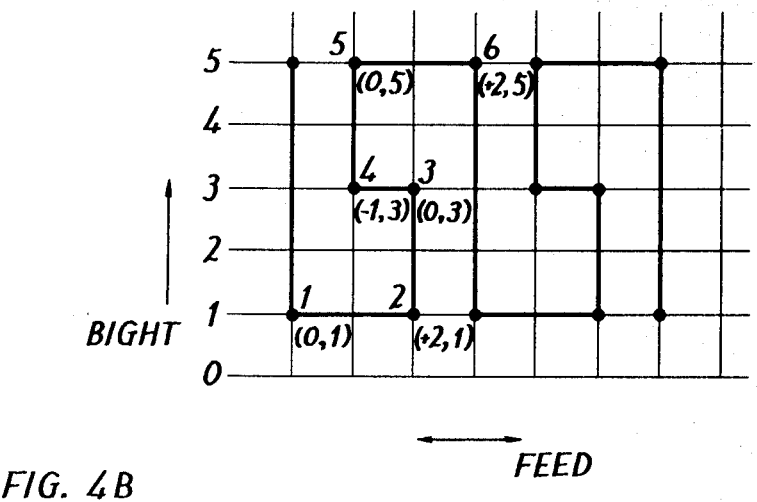
FIG. 4A is a view showing one example of a pattern for explaining the operation of the FIG. 2 embodiment.
FIG. 4B is a view showing positional data of the respective stitches.

FIG. 4A shows one example of a pattern to be sewn, wherein the abscissa indicates the feed or cloth feed amount while the ordinate indicates the bight or the stitch width amplitude. FIG. 4B shows data concerning positional information of the bight and feed of the pattern. The bight is set in its absolute coordinate position and, in the pattern example shown, the maximum amplitude amount is equally divided into five. On the other hand, the feed is set by way of a relative displacement amount and, in the pattern example shown, the minimum feed amount, i.e. the absolute travel amount from the third to fourth position in the pattern example shown, is denoted as unity "1".

As for the first stitch, the bight is the lowermost in the figure and the feed is "0" since the same is in a stationary state wherein no forward or backward (leftward or rightward in the figure) travel from the former stitch or the sixth stitch occurs. As for the second stitch, the coordinate position of the bight is the same position as the first stitch while the feed comes forward by unit "2" in a relative manner from the first stitch to become "+2". Similarly, the positional data of the bight and feed for the third to sixth stitches can be shown as numeral values as shown in FIG. 4B.

The relation between the resistance circuits Rb1 and Rf1 and the analog switches 59 and 81 shown in FIGS. 3A and 3B is based on the pattern example shown in FIGS. 4A and 4B. The pattern example in FIG. 4A is indicated as pattern P1, wherein for the first stitch the bight is "1" and the feed is "0", so that the input electrode of the switching device Qb1 of the analog switch 59 is connected to the junction ① of the corresponding resistance circuit Rb1 and the input electrode of the switching device Qf1 of the analog switch 81 is connected to the junction ⓪ of the corresponding resistance circuit Rf1. For the second stitch, the bight remains the same "1" as the first stitch while the feed is "+2". Accordingly, the input electrode of the switching device Qb2 of the analog switch 59 is connected to the junction ① of the resistance circuit Rb1 and the input electrode of the switching device Qf2 of the analog switch 81 is connected to the junction ② of the corresponding resistance circuit Rf1. For the third stitch of the pattern shown, the feed amount is "0" while the bight is in the position "3". Accordingly, the input electrode of the switching device Qb3 of the analog switch 59 is connected to the junction ③ of the resistance circuit Tb1 and the input electrode of the switching device Qf3 of the analog switch 81 is connected to the junction ⓪.

Similarly, for the fourth stitch of the pattern shown, the bight remains the same "3" as the third stitch, while the feed is the rearward "−1". For the fifth stitch, the bight is "5", while the feed is "0" since the feed is in the same position as the fourth stitch. For the sixth stitch, i.e. the final stitch of one cycle of the pattern example shown, the bight is the same as the fifth stitch, while the feed is "+2". Accordingly, the input electrodes of the switching devices Qb4 through Qb6 of the analog switch 59 and the input electrodes of the switching devices Qf4 through Qf6 of the analog switch 81 are connected as shown in FIGS. 3A and 3B.

The operation of the embodiment shown in FIGS. 2 and 3 is as follows. First a pattern to be sewn is selected by means of the pattern selecting switch 51. By way of an example, assume that the pattern P1, i.e. the pattern example shown in FIG. 4A is selected. Accordingly, a pattern signal representative of the pattern P1 is obtained from the switch decoder 53. Therefore, the associated switches Sb1 and Sf1 of the resistance network 57 and 79 are turned on. Accordingly, the voltages +Vb and Vf are applied only to the voltage divider circuits Rb1 and Rf1, while the remaining voltage divider circuits Rb2 through Rbn and Rf2 through Rfn are not supplied with any voltage. The switch decoder 53 is responsive to selection of the pattern P1 by means of the pattern selection switch 51 to provide a signal representative of the number of the stitches in one cycle of the pattern P1, the number "6" in the example shown, to the counters 55 and 77. Accordingly, these counters 55 and 77 are preset as a six count counter.

The driving motor is then energized, whereby the upper shaft 5 starts to rotate causing the bight pulse generator 17 and the feed pulse generator 19 to generate pulses. The first pulse obtained from the feed pulse generator 19 causes the feed counter 77 to advance one position to provide, for example, an output F1. Therefore, the switching device Qf1 in the analog switch 81 is turned on and the output obtainable from the junction ⓪ of the voltage divider circuit Rf1 is coupled through the switching device Qf1 to the output voltage terminal Vfout. The output voltage is coupled to the adder where a negative polarity bias voltage provided by the bias voltage source 85 is added thereto. The bias voltage is of an amplitude such that the voltage after addition, which is a voltage representative of the feed "0", does not cause the direct current motor 37 shown in FIGS. 1 and 2 to rotate. Accordingly, the feed dog 13 shown in FIG. 1 does not effect movement of the cloth. Thereafter the upper shaft 5 is rotated and one pulse is obtained from the bight pulse generator 17. Accordingly, the bight counter 55 advances one position and since it is synchronized with the feed counter 77 it provides an output Q1. Therefore, the switching device Qb1 of the analog switch 59 is rendered conductive. Accordingly, the voltage representative of the bight position "1" which is obtained from the junction ① of the voltage divider circuit Rb1 is coupled by the switching device Qb1 to the bight output terminal Vbout. Accordingly, the direct current motor 43 shown in FIGS. 1 and 2 is rotated in accordance with the amplitude of the bight output voltage whereby the needle bar support 49 is rotated to swing the needle 11 in the direction of arrow H to the 1 bight position. Accordingly, the needle 11 is stopped at the coordinate position of the first needle penetration in the pattern example shown in FIG. 4A.

The upper shaft 5 is further rotated and the second pulse is obtained from the feed pulse generator 19. Accordingly, the output F2 is obtained from the counter 77 and the switching device Qf2 of the analog switch 81 is turned on. Therefore, the voltage from the junction ② of the voltage divider circuit Rf1 is applied to the output terminal Vfout of the analog switch 81, whereby the direct current motor 37 is driven. The upper shaft 5 continues to rotate and the second pulse is obtained from the bight pulse generator 17. Accordingly, the output Q2 is obtained from the counter 55. Therefore, the switching device Qb2 of the analog switch 59 is turned on. Accordingly, the voltage from the junction ① of the voltage divider circuit Rb1 is applied through the switching device Qb2 to the output terminal Vbout. Therefore, the direct current motor 43 is driven, whereby the bight is determined. Thus, the feed voltage and the bight voltage associated with the successive needle positions of the pattern P1 are obtained in order in response to the pulse signals from the feed pulse generator 19 and the bight pulse generator 17.

After the sixth pulse representative of the final switch in the pattern P1 is obtained from the feed pulse generator 19 and the bight pulse generator 17, the next pulse, the seventh, returns the counters 77 and 55 to the initial state, whereupon the outputs F1 and Q1 are again provided. The resetting of the counters 77 and 55 is caused by the signal from the switch decoder 53.

Although the bight resistance network 57 and the feed resistance network 79 shown in FIGS. 3A and 3B each comprise a plurality of separate voltage divider circuits Rb1 through Rbn and Rf1 through Rfn, respectively, these plurality of voltage divider circuits may be arranged in a modular form by using integrated circuits (chips) containing a similar number of resistors, for example, five printed on each chip. The chips are combined as desired depending on the required performance of a sewing machine or a pattern to be sewn. Such chips have temperature characteristics which are extremely stabilized and enchance the reliability of the circuit. Furthermore, the modular construction simplifies maintenance.

Figure 5:
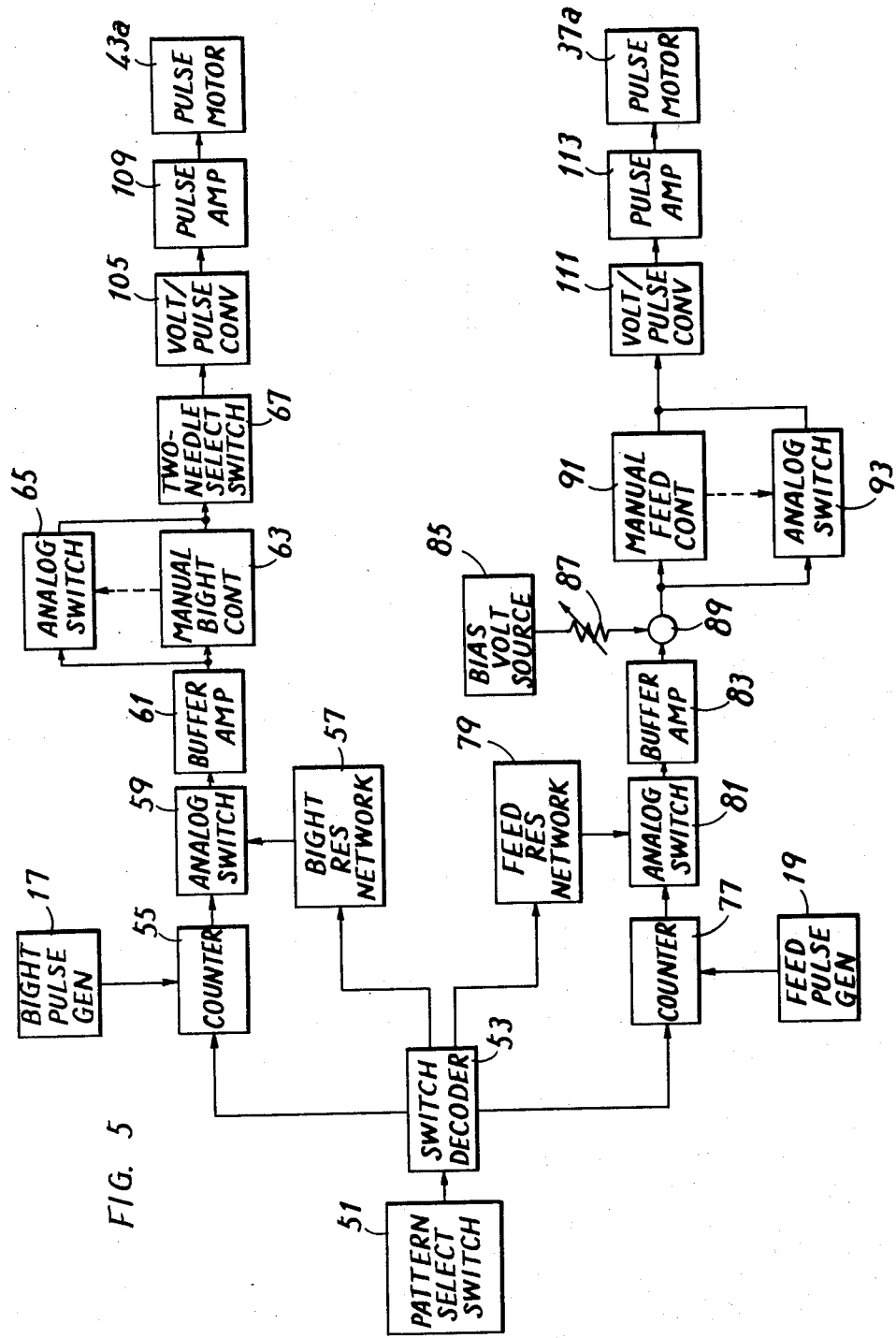
FIG. 5 is a block diagram of another embodiment of the present invention.

FIG. 5 shows another embodiment of the present invention wherein the elements which are similar to those in the FIG. 2 embodiment are indicated with the same reference numerals. In FIG. 5, the bight voltage and the feed voltage obtained from the analog switches 65 and 93, respectively, are applied to voltage/pulse converters 105 and 111, respectively. The voltage/pulse converters 105 and 111 convert the analog signal applied thereto into a number of pulses corresponding to the bight voltage. The outputs of these voltage/pulse converters 105 and 111 are applied to pulse amplifiers 109 and 113, respectively. The pulse outputs of these pulse amplifiers 109 and 113 are respectively applied as driving signals to the pulse motor 43A for bight control and to the pulse motor 37a for the feed control.

In the above described embodiments, a single bight counter 55 and a single feed counter 77 are provided for counting the stitches for the patterns to be sewn and a voltage divider is provided per each kind of pattern. Alternatively, a single voltage divider may be provided for the various kinds of patterns, while a plurality of counters, one for each kind of pattern, is provided. Such an embodiment is shown in FIG. 6.

Figure 6:
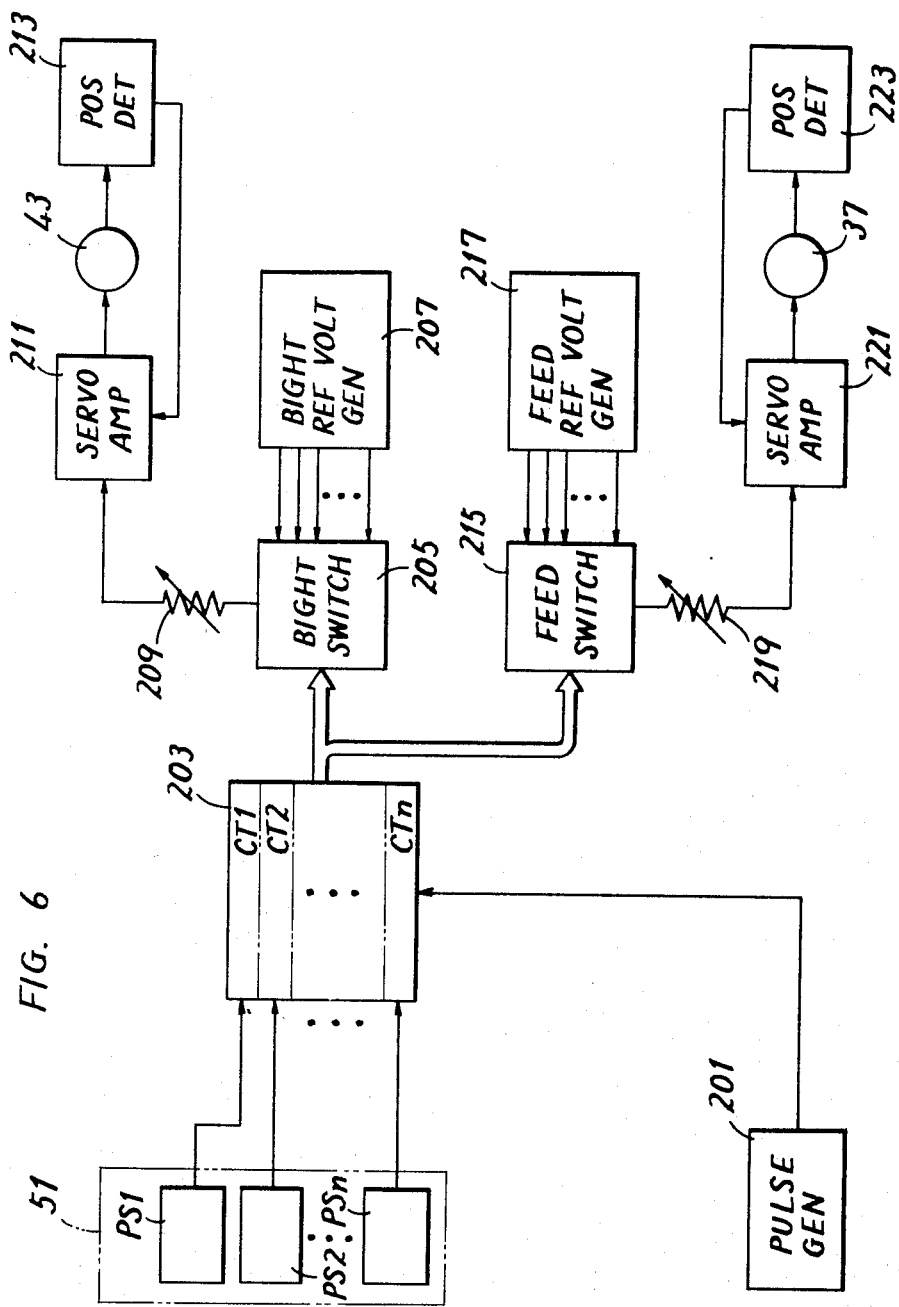
FIG. 6 is a block diagram of a further embodiment of the present invention.

The embodiment shown in FIG. 6 is adapted to be capable of sewing a plurality (n) of patterns. To that end, a pattern selection switch 51 is provided. The pattern selection switch 51 comprises a plurality (n) of switches PS1 through PSn, such that selective operation of any switch causes a corresponding pattern selection signal to be provided. A pattern selection signal is applied to a counter group 203 as a counter designating signal. The counter group 203 comprises a plurality of counters CT1 through CTn, one for each pattern, the particular counter associated with a particular pattern being rendered operative by the counter designating signal. The counters CT1 through CTn are supplied with a clock signal by a pulse generator 201, which may be similar to the previously described pulse generator 17 or 19. The pulse generator 201 generates one pulse for each stitch.

The signals from the operative counter in the counter group 203 are applied as switching control signals to the bight switching circuit 205 and to the feed switching circuit 215. The bight switching circuit 205 is responsive to the signal from the operative counter in the counter group 203 to selectively provide at its output one of a plurality of reference voltages supplied by the bight reference voltage generator 207. The feed switching circuit 215 is responsive to the signal from the operative counter of the counter group 203 to selectively provide at its output one of a plurality of reference voltages supplied from the feed reference voltage generator 217.

The reference voltage obtained from the bight switching circuit 205 and corresponding to the bight position is applied through a bight fine adjusting variable resistor 209 to a servomechanism including a servo-amplifier 211, a servo-motor 43b, and a position detecting circuit 213. The feed reference voltage is applied through a feed fine adjusting variable resistor 219 to a servomechanism including a servo-amplifier 221, a servo-motor 37b, and a position detecting circuit 223.

Figure 8:
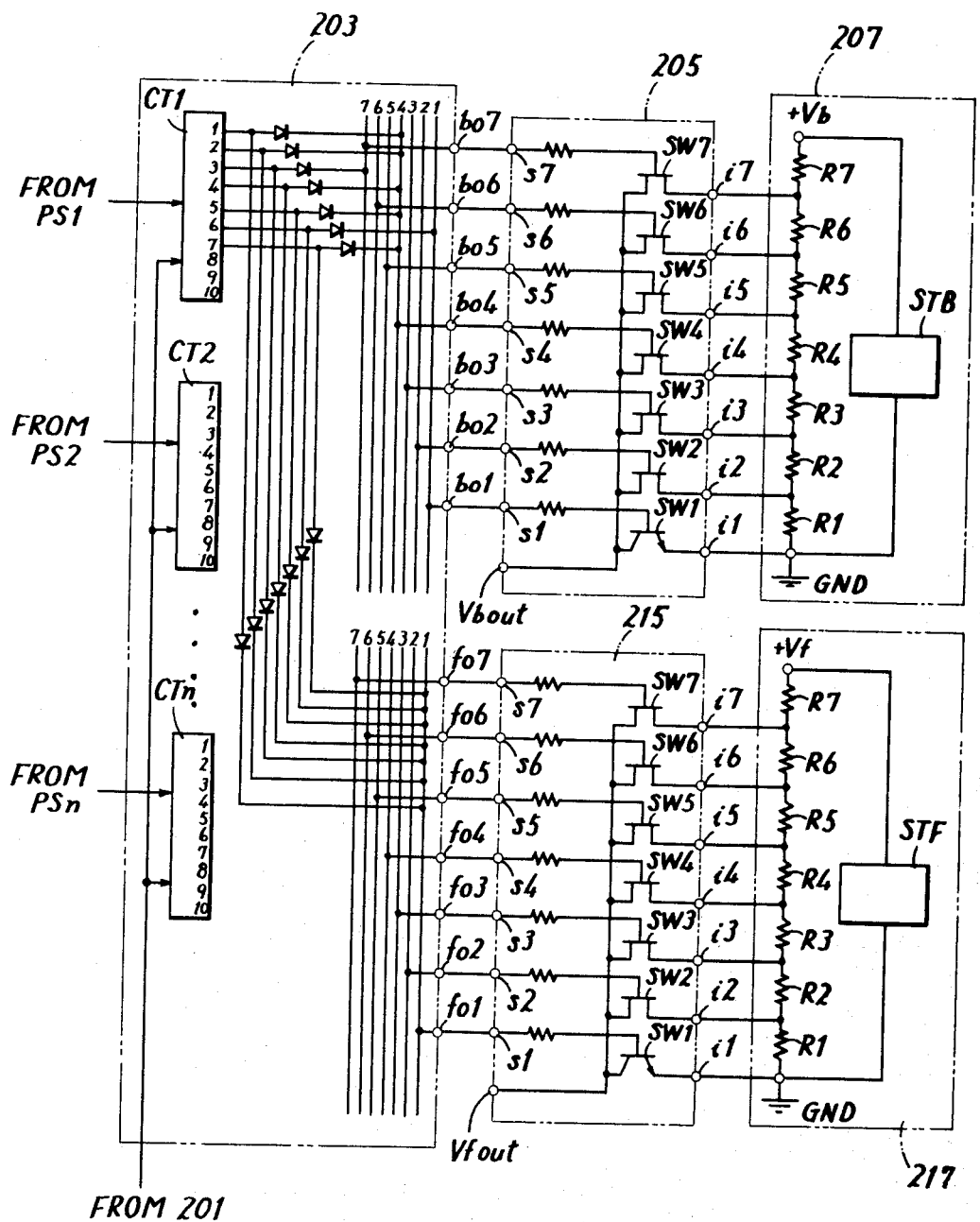
FIG. 8 is a schematic diagram of the major portion of the FIG. 6 embodiment.

FIG. 8 shows a schematic diagram of the counter group 203, the bright switch 205, the bight reference voltage generator 207, the feed switch 215, and the feed reference voltage generator 217, shown in FIG. 6. The embodiment shows a case where the maximum bight and feed amplitude of the needle 11 is equally divided into seven, although the same may be increased or decreased as required. The counter group 203 comprises a plurality (n) of counters CT1 through CTn, which may be decimal counters, the number depending on the number of patterns. The maximum count on each counter is determined by the number of stitches in the associated pattern. The respective counters CT1 through CTn are rendered operative in response to the selection signals from the associated pattern selection switches OS1 through PSn. The operative counter steps once in response to each timing pulse from the timing pulse generator 201.

The counter group 203 comprises common bight step output terminals bo1 through bo7 and common feed output terminals fo1 through fo7. These common output terminals bo1 through bo7 and fo1 through fo7 are individually and specifically connected to the output terminals of each counter CT1 through CTn based on the bight position and feed amount of the particular pattern associated with that counter CT1 through CTn.

The outputs bo1 through bo7 of the above described counter group 203 are connected to the respective switching input terminals S1 through S7 included in the bight switching circuit 205. The input terminals S1 through S7 of the switching circuit 205 are connected to the respective control electrodes of the switching devices SW1 through SW7. The input electrodes of the switching devices SW1 through SW7 are connected to the respective analog voltage input terminals i1 through i7 of the switching circuit 205. The output electrodes of the switching devices SW1 through SW7 are connected to the bight reference voltage output terminal Vbout of the switching circuit 205.

The bight reference voltage generator 207 comprises a stabilized voltage source STB which may be an integrated circuit. The stabilized voltage source STB is adapted to generate a direct current voltage +Vb, one output terminal of which is connected to the ground GND. A voltage divider is connected between both output terminals of the voltage source STB, which voltage divider includes seven series connected resistors R1 through R7. The grounded output terminal is connected to the voltage input terminal i1 of the switching circuit 205, the series junction between the resistors R1 and R2 is connected to the voltage input terminal i2, the junction between the resistors R2 and R3 is connected to the input terminal i3, the junction between the resistors R3 and R4 is connected to the input terminal i4, the junction between the resistors R4 and R5 is connected to the input terminal i5, the junction between resistors R5 and R6 is connected to the input terminal i6 and the junction between the resistors R6 and R7 is connected to the input terminal i7. Accordingly, each of the voltage input terminals i1 through i7 is supplied with a different bight control reference voltage.

In a like manner, as shown in FIG. 8, the counter output terminals fo1 through fo7 are connected to the respective switching input terminals S1 through S7 included in the feed switching circuit 215. The respective input terminals S1 through S7 of the switching circuit 215 are individually connected to the control electrodes of the corresponding switching devices SW1 through SW7. The input electrodes of the switching devices SW1 through SW7 are respectively connected to the analog voltage input terminals i1 through i7 of the feed switch 215. The output electrodes of the respective switching devices SW1 through SW7 are connected to the feed reference voltage output terminal Vfout of feed switch 215.

The feed reference voltage generator 215 comprises a stabilized voltage source STF which may be an integrated circuit. The stabilized voltage source STF is adapted to generate a direct current voltage +Vf, one output terminal of which is connected to the ground GND. A voltage divider is connected between both output terminals of the voltage source STF which voltage divider includes seven series connected resistors R1 through R7. The grounded output terminal is connected to the voltage input terminal i1 of the switching circuit 215, the series junction of the resistors R1 and R2 is connected to the voltage input terminal i2, the junction between the resistors R2 and R3 is connected to the input terminal i3, the junction between the resistors R3 and R4 is connected to the input terminal i4, the junction between the resistors R4 and R5 is connected to the input terminal i5, the junction between the resistors R5 and R6 is connected to the input terminal i6, and the junction between the resistors R6 and R7 is connected to the input terminal i7. Accordingly, each of the voltage input terminals i1 through i7 is supplied with a different feed control reference voltage.

Figures 7A, 7B:
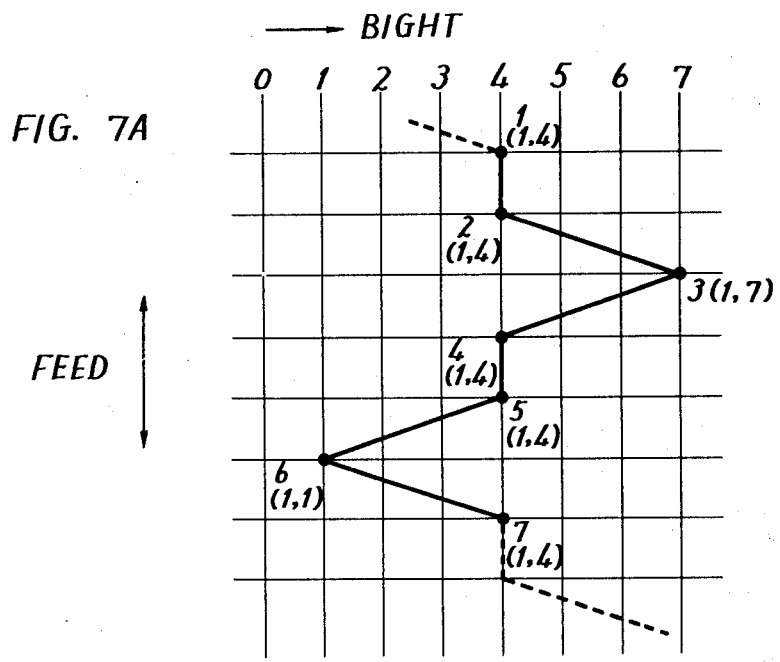
FIG. 7A is a view showing one example of a pattern for explaining the operation of the FIG. 6 embodiment.
FIG. 7B is a view showing positional data of the respective stitches.

FIG. 7A shows one example of a specific pattern for explanation of the embodiment and FIG. 7B shows positional information of the pattern and the bight and feed associated therewith. In FIG. 7A, the ordinate direction shows the feed, which is constant step of "1", and the abscissa direction shows the bight position. The pattern example shown is adapted to complete one cycle stitch by seven stops or seven needle drop number. In the following, the embodiment shown in FIGS. 6 and 8 will be described along with this specific pattern example. First one of the switches PS1 through PSn of the pattern selection switch 51 is selected to designate the pattern example shown in FIG. 7A. For convenience sake, it is assumed that, in the embodiment shown, the pattern shown in FIG. 7A is associated with the first counter C1.

As shown in FIG. 7B, the step sequential bight is "4", "4", "7", "4", "4", "1", "4", and the like and the feed is "1", "1", "1", and the like. Therefore, the output terminal 1 through 7 of the counter C1 are in turn connected through the common lines to the common output terminals bo4, bo4, bo7, bo4, bo4, bo1, and bo4. At the same time, the output terminals 1 through 7 of the counter C1 are connected respectively through the common lines to the common output terminals fo1, fo1, fo1, fo1, fo1, fo1, and fo1.

In a sewing operation, a power source 51 is turned on and the switch PS1 of the pattern selection switch 51 is operated, whereby only the counter C1 is enabled and is reset. When the driving motor rotates, the upper shaft 5 rotate, whereby the pulse generator 201 generates a timing pulse per each reciprocation of the needle 11.

In operation, in the first step, the output terminal 1 of the counter C1 is the high level, while the remaining output terminals are the low level. Therefore, only the bight common output terminal bo4 becomes the high level. Accordingly, in the first step, the switching device SW4 of the bight switching circuit 205 is turned on responsive to the high level signal from the terminal bo4. Therefore, the divided voltage Vb4 is obtained as the first step bight reference voltage from the reference voltage output terminal Vbout of the switching circuit 205. At the same time, only the feed common output terminal fo1 becomes the high level. Accordingly, in the first step, the switching device SW1 of the feed switching circuit 215 is turned on responsive to the high level signal from the terminal fo1. Therefore, the ground voltage Vf1 is obtained as the first step feed reference voltage from the reference voltage output terminal Vfout of the switching circuit 215. The first step bight reference voltage obtained from the bight switching circuit 205 is applied through the variable resistor 209 to the servo-amplifier 211. The first step feed reference voltage obtained from the feed switching circuit 215 is applied through the variable resistor 219 to the servo-amplifier 211. Therefore, the bight controlling servo-motor 43b is rotated by the angle associated with the bight position "4", i.e. the reference voltage Vb4, whereby the swing width in the arrow H direction of the needle 11 in FIG. 1 is controlled. The feed controlling servo-motor 37b is rotated by the angle associated with the feed amount "1", i.e. the reference voltage Vf1, whereby the displacement amount in the arrow E direction of the feed dog 13 in FIG. 1 is controlled.

When the first step sewing operation thus described is completed, a second step timing pulse is obtained from the timing pulse generator 201. Accordingly, the output terminal 2 of the counter C1 becomes the high level. Therefore, the same operation as the first step is carried out. The same operation is repeated for seven steps. The counter is reset by the eighth timing pulse. In case of a one-cycle pattern stitch, the counter may be adapted such that the driving motor is stopped at the end of one cycle.

In the embodiment shown in FIGS. 11 to 14, wherein parts similar to those in FIG. 2 are indicated with the same reference numerals, a single voltage divider 230 and a single bight counter 55 are provided in bight circuit and a single voltage divider 232 and a single feed counter 77 are provided in the feed circuit. Programing of the bight and feed voltages for the various patterns is provided by a pair of switch matrices 234 and 236.

Figure 12:
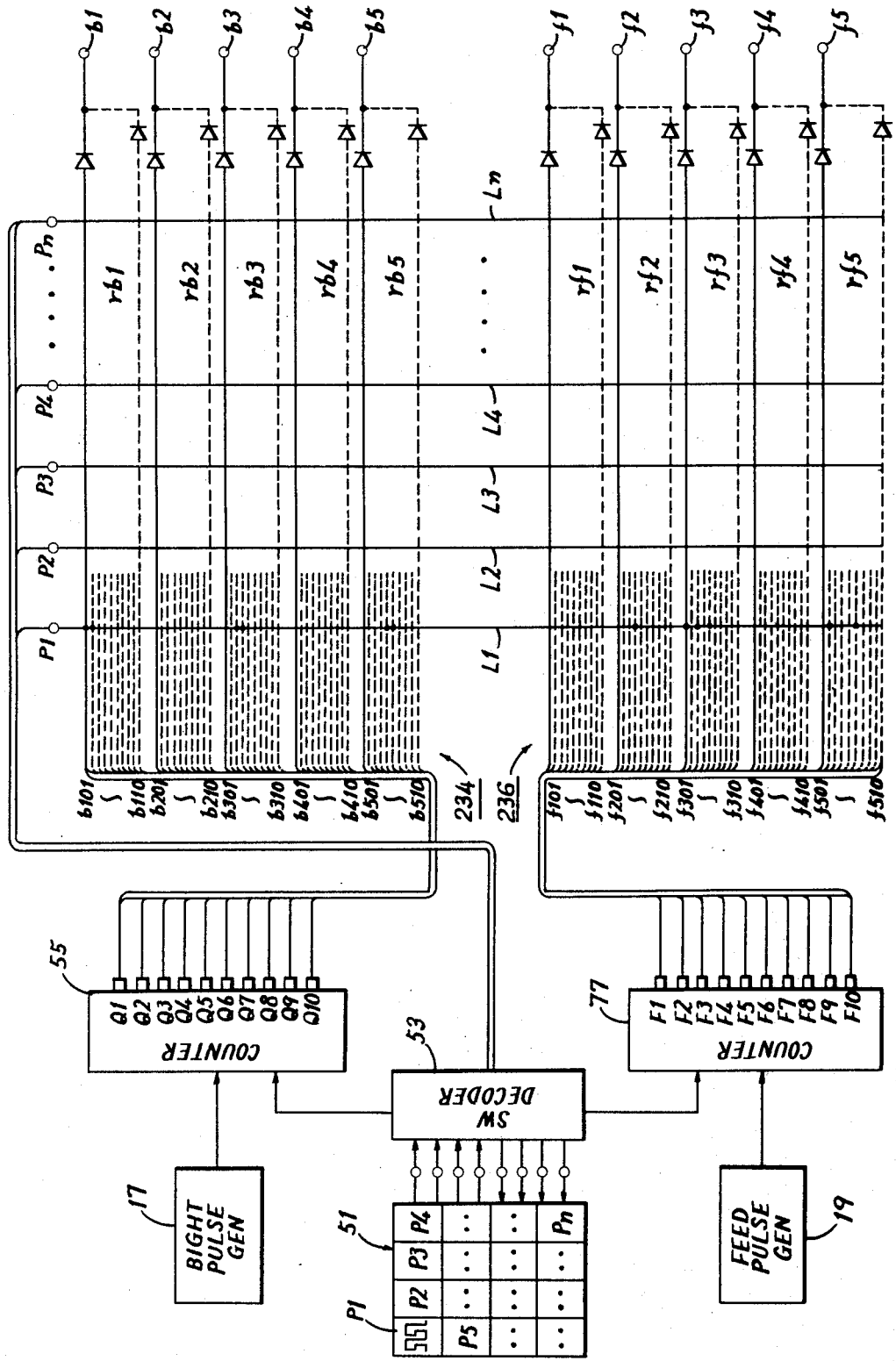
FIG. 12 shows a schematic diagram of a portion of the FIG. 11 embodiment.
Figure 13A:
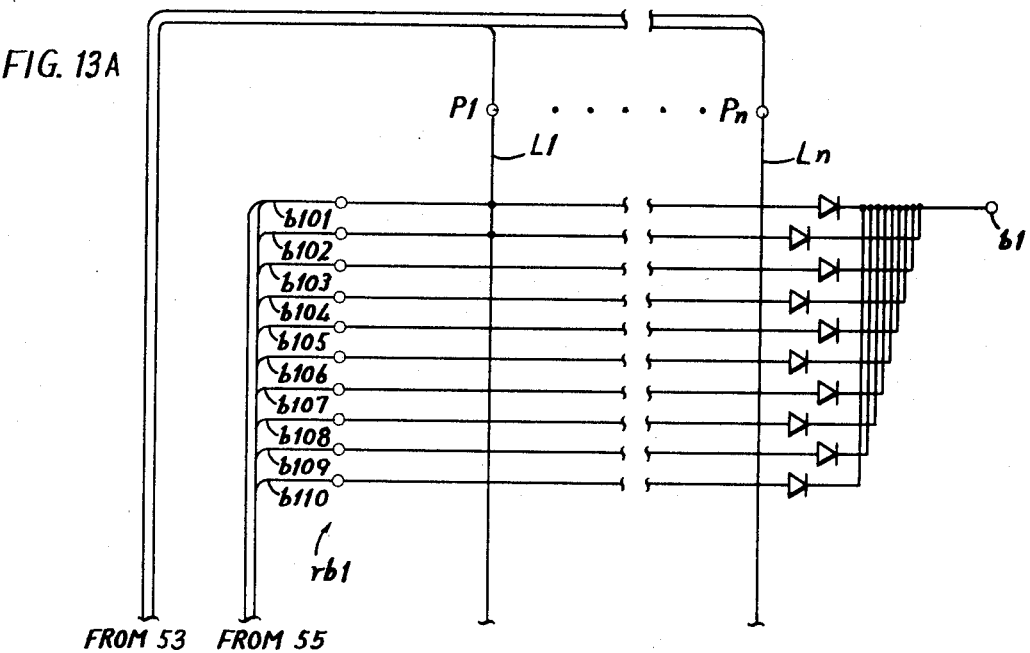
FIGS. 13A and 13B shows in more detail a portion of FIG. 12.
Figure 13B:
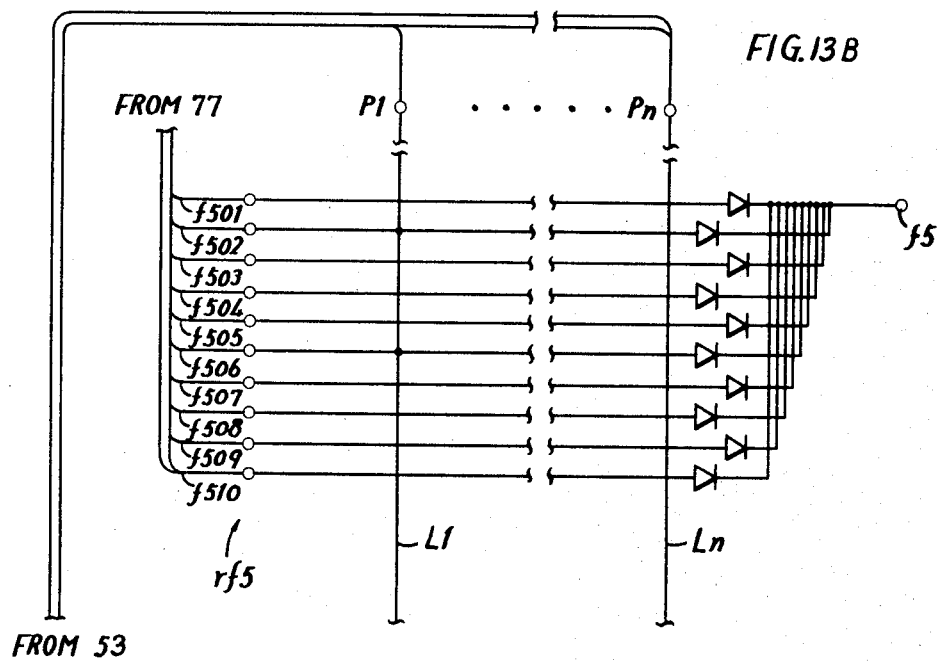

As shown in FIGS. 12 and 13, the bight switch matrix 234 and the feed switch matrix 236 include common column lines L1 to Ln. The column lines L1 to Ln correspond to the respective patterns P1 to Pn selectable by the pattern selection switch 51 and are enabled or supplied with a voltage by the above described signals P1 to Pn only when the pattern is selected. The bight switch matrix 234 comprises five sets rb1 to rb5 of the row lines. The feed switch matrix 236 comprises five sets rf1 to rf5 of the row lines. Each of the sets rb1 to rb5 and rf1 to rf5 of row lines includes ten row lines b101-b110 to b501-b510 and f101-f110 to f501-f510 corresponding to the number of outputs of the counters 55 and 77, i.e. the maximum stitch number in one cycle of the pattern. The respective row lines b101 to b510 and f101 to f510 are connected to the column lines L1 to Ln in different manners for each of the column lines L1 to Ln to thereby implement a logical product switch matrices 234 and 236. FIGS. 13A and 13B show in more detail one of the sets of each of these matrices 234 and 236. Each connection between a row line and a column line, while being shown as a dot for convenience of illustration, is a field effect transistor with its gate electrode connected to the input of the row line, its source electrode connected to the control line, and its drain or output electrode connected to the output of the row line.

As shown in FIG. 12, the outputs Q1 to Q10 of the counter 55 are respectively connected to the corresponding row lines b101 to b110 of the first set rb1, to the corresponding row lines b201 to b210 of the second set rb2, to the corresponding row lines b301 to b310 of the third set rb3, to the corresponding row lines b401 to b410 of the fourth set rb4, and to the corresponding row lines b501 to b510 of the fifth set rb5. Likewise, the outputs F1 to F10 of the counter 77 are respectively connected to the corresponding row lines f101 to f110 of the first set rf1, to the corresponding row lines f201 to f210 of the second set rf2, to the corresponding row lines f301 to f310 of the third set rf3, to the corresponding row lines f401 to f410 of the fourth set rf4, and to the corresponding row lines f501 to f510 of the fifth set rf5. Accordingly, each time the corresponding counters 59 and 77 make a stepping operation, the corresponding row lines of the respective sets rb1 to rb5 and rf1 to rf5 are commonly designated. The logical product outputs of the intersections between the respective sets rb1 to rb5 and rf1 and rf5 of the row lines and the column lines L1 to Ln are supplied to the terminals b1 to b5 and f1 to f5 which, in turn, are applied to the corresponding analog switches 65 and 85.

Figure 14A:
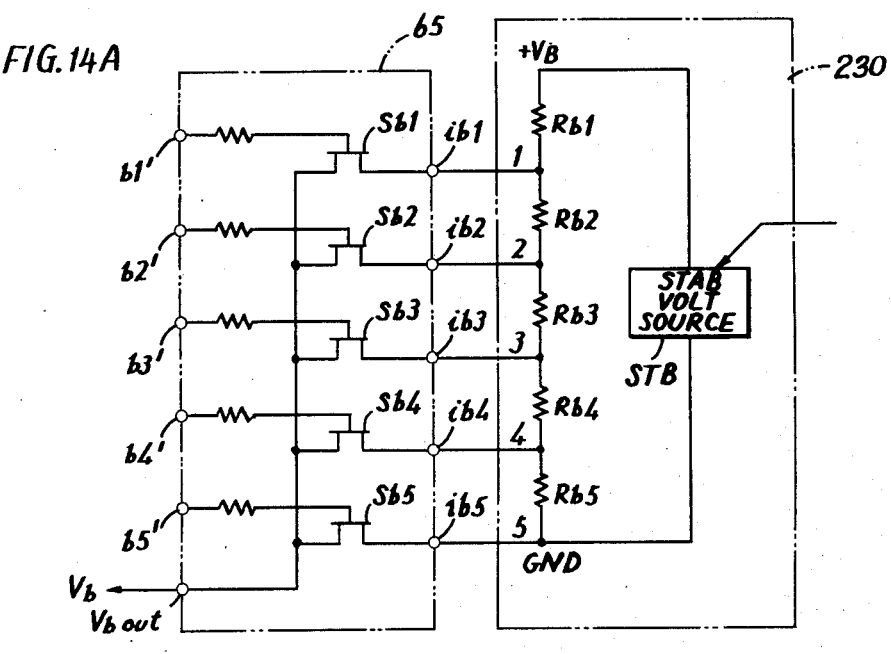
FIGS. 14A and 14B are schematic diagrams of the reference voltage circuit and the analog switch of the FIG. 11 embodiment.

Now referring to FIGS. 14A and 14B, the bight reference voltage circuit 230, the analog switch 65, the feed reference voltage circuit 202 and the analog switch 85 will be described in detail. In the embodiment shown in FIG. 14A, the maximum amplitude of the bight of the sewing needle 11 is equally divided into five, although the number may be increased or decreased as necessary.

The bight switch matrix 234 comprises five bight output terminals b1 to b5, which are correspondingly and individually connected to the switching input terminals b1' to b5' included in the bight analog switch 65. The respective input terminals b1' to b5' of the analog switch 65 are individually connected to the control electrodes of the corresponding switching devices Sb1 to Sb5, which may be field effect transistors. The respective input electrodes of the switching devices Sb1 to Sb5 are individually connected to the respective analog voltage input terminals ib1 to ib5 from the respective resistor dividing points of the bight reference voltage circuit 230. The respective output electrodes of the switching devices Sb1 to Sb5 are commonly connected to the bight output voltage terminal Vbout of the analog switch 65.

The bight reference voltage circuit 230 comprises a stabilized voltage source STB implemented, for example, in an integrated circuit. The stabilized voltage source STB is structured to produce a direct current voltage −VB at one output terminal, while the outer terminal is connected to the ground GND. A series connection of five voltage dividing resistors Rb1 to Rb5 is connected between the output terminals of the voltage source STB. The junction between resistors Rb1 and Rb2 is connected to the voltage input terminal ib1 of the analog switch 65, the junction between the resistors Rb2 and Rb3 is connected to the voltage input terminal ib2, the junction between the resistors Rb3 and Rb4 is connected to the input terminal ib3, the junction between the resistors Rb4 and Rb5 is connected to the input terminal ib4, and the junction between the resistor Rb5 and the ground GND is connected to the input terminal ib5. Accordingly, the voltage input terminal ib1 to ib5 are supplied with a plurality of different reference voltages for bight control. The input terminal ib1 is supplied with a voltage corresponding to the bight coordinate "1" of the stitches, the input terminal ib2 is supplied with a voltage corresponding to the bight coordinate "2∞, the input terminal ib3 is supplied with a voltage corresponding to the bight coordinate "3", the input terminal ib4 is supplied with a voltage corresponding to the bight coordinate "4", and the input terminal ib5 is supplied with a voltage corresponding to the bight coordinate "5".

Figure 14B:
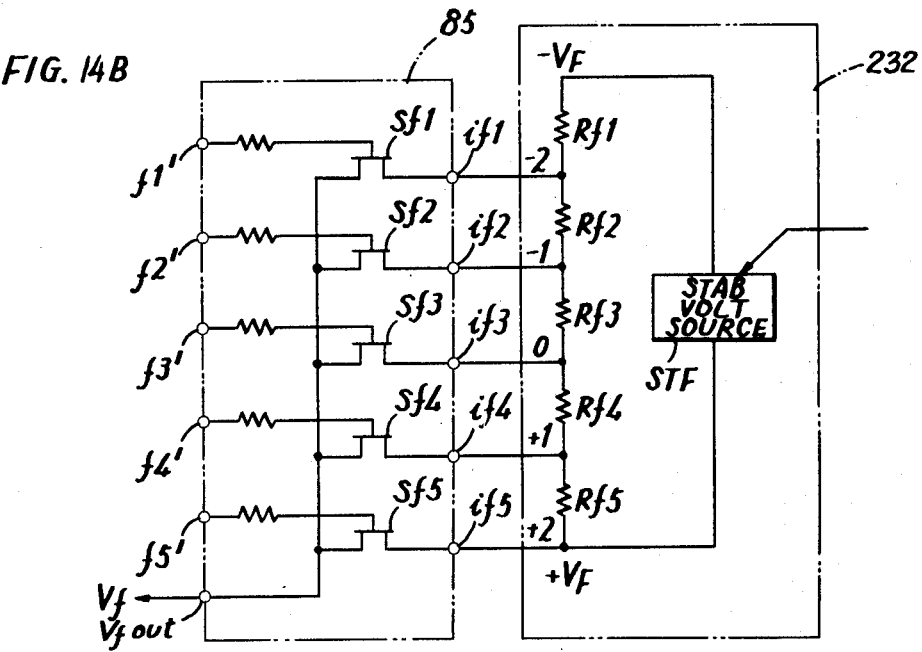

FIG. 14B shows a case where the maximum feed amount is equally divided into five, although the number may be increased or decreased as necessary. The feed switch matrix 236 comprises five feed output terminals f1 to f5, which are correspondingly and individually connected to the switching input terminals f1' to f5' included in the feed analog switch 85. The details of the analog switch 85 and the reference voltage circuit 232 is substantially the same as that for bight shown in FIG. 14A and therefore a detailed description is omitted. The input terminal if1 is supplied with a voltage corresponding to the feed amount "−2" for each stitch, the input terminal if2 is supplied with a voltage corresponding to the feed amount "−1", the input terminal if3 is supplied with a voltage corresponding to the feed amount "0", the input terminal if4 is supplied with a voltage corresponding to the feed amount "+1", and the input terminal if5 is supplied with a voltage corresponding to the feed amount "+2".

In the embodiment shown, the bight is controlled in terms of an absolute coordinate position and the feed is controlled in terms of a relative amount. Also, the sign of minus for the feed amount indicates backward feed, while the sign of plus for the feed amount indicates forward feed. Thus, the analog switch 65 serves to provide a voltage developed in the bight reference voltage circuit 230 as a bight voltage corresponding to the coordinate position for each stitch. The analog switch 85 serves to provide a feed voltage corresponding to the coordinate position or the feed amount for each stitch.

In the embodiment illustrated in FIG. 12, the row lines b101 to b510 are connected to the column line L1 to provide the bight voltages for the pattern P1 shown in FIG. 4A and the row lines f101 to f510 are connected to the column line L1 to provide the feed voltages for the pattern P1 shown in FIG. 4A. In the first stitch, the bight is the lowest, as viewed in FIG. 4A. The feed is in a still state without any shift forward and rearward, or leftward and rightward as viewed in the figure, from the immediately preceding stitch, i.e. the six stitch, and thus the feed is "0". Accordingly, the column line L1 corresponding to the pattern P1 of the feed switch matrix 236 and the row lines f301 corresponding to the first stitch are connected in a logical product fashion. The column line L1 of the bight switch matrix 234 and the row line b101 are similarly connected.

In the second stitch, the bight remains the same "1" as the first stitch and the feed advances relatively by the unit "2" from the first stitch and thus the feed is "+2". Accordingly, the column line L1 of the matrix 236 and the row line f502 corresponding to the second stitch are connected in a logical product manner, and the column line L1 and the row line b102 are connected in a logical product fashion.

In case of the third stitch of the pattern, the feed amount is the same as that of the second stitch and remains "0", and the bight is in the position of "3". Accordingly, the column line L1 of the matrix 236 and the row line f103 are connected in a logical product manner and the column line L1 and the row line b303 of the matrix 234 are connected in a logical product manner.

Similarly, the positional data of the bight and feed from the fourth to the sixth can be shown by the numerical values shown in FIG. 4B.

The operation of the embodiment shown in FIGS. 11 to 14 will be described in the following. First, a pattern being sewn is selected by the pattern selection switch 51. Let it be assumed that the pattern P1, i.e. the pattern example shown in FIG. 4A is selected by way of an example. Accordingly, the pattern signal P1 representing the pattern is obtained from the switch decoder 53. Therefore, the high level voltage is applied only to the column line L1 of the switch matrices 234 and 236. The remaining column lines L2 to Ln are not supplied with any voltage. Thus, only the column line L1 corresponding to the pattern P1 is rendered active or effective. The foot controller pedal is then depressed, whereby a driving motor is rotated. Accordingly, the upper shaft 5 starts rotating and the bight pulse generator 17 and the feed pulses generator 19 are rendered in an operative state. Responsive to selection of the pattern P1 by means of the pattern selection switch 51, a signal indicating the number of stitches in one cycle of the pattern, or the number "6" in the embodiment shown is obtained from the switch decoder 53 and is applied to the counters 55 and 77. Accordingly, these counters 55 and 57 are preset to serve as a 6-nary counter.

As the drive motor, not shown, rotates, one pulse is obtained from the feed pulse generator 19. Accordingly, the feed counter 77 counts the pulse to provide the output F1. Accordingly, the row lines f101, f201, f301, f401, and f501 of the respective row line sets rf1 to rf5 of the matrix 236 are commonly supplied with the high level. The column line L1 and the row line f301 are connected as shown in FIGS. 12 and 13B. Therefore, a high level switching signal is obtained from the row line f301 and thus from the terminal f3. Accordingly, the switching device Sf3 of the analog switch 85 shown in FIG. 14B is turned on. Therefore, the voltage corresponding to the feed amount "0" obtainable from the feed reference voltage circuit 232 is supplied through the conducting switching device Sf3 to the feed voltage terminal Vfout. Since the voltage obtainable at the output terminal Vfout is a voltage indicating the feed "0", the direct current motor 37 shown in FIGS. 1 and 2 does not rotate. Accordingly, the feed dog 13 shown in FIG. 1 does not feed the cloth.

The upper shaft 5 is further rotated and a further pulse is obtained from the bight pulse generator 17. Accordingly, the counter 55 counts pulse to provide the output Q1. Therefore, the row lines b101, b201, b301, b401 and b501 of the row line sets rb1 to rb5 of the matrix 234 are commonly supplied with the high level. The column line L1 and the row line b101 are connected as shown in FIGS. 12 and 13A. Therefore, a high level switching signal is obtained from the row line b101 and thus from the terminal b1. The switching device sb1 of the analog switch 65 shown in FIG. 14A is turned on. A voltage corresponding to the bight amount "1" obtainable from the bight reference voltage circuit 230 is supplied through the conducting switching device Sb1 to the bight output terminal Vbout. The direct current motor 43 shown in FIGS. 1 and 2 is rotated by the voltage, whereby the needle bar support is rotated and thus the sewing needle 11 is swung in the arrow H direction. Accordingly, the sewing needle is brought to the position of the first stitch of the pattern example shown in FIG. 4A.

The upper shaft 5 is further rotated and the second pulse is obtained from the feed pulse generator 19. The output F2 is obtained from the counter 77 and the switching device Sf5 of the analog switch 85 is turned on. Accordingly, a voltage corresponding to the feed amount "+2" obtainable from the reference voltage circuit 232 is withdrawn at the output terminal Vfout of the analog switch 85, whereby the direct current motor 37 is driven thereby. The upper shaft 5 is further rotated and the second pulse is obtained from the bight pulse generator 17. The output Q2 is obtained from the counter 55. The switching device Sb1 of the analog switch 65 is turned on. Accordingly a voltage corresponding to the bight amount "1" obtainable from the reference voltage circuit 230 is withdrawn through the switching device Sb1 at the output terminal Vbout. As a result, the direct current motor 43 is driven and the bight width is determined. Thus, the feed voltage and the bight voltage associated with the switch are withdrawn responsive to the pulse signal for each switch obtainable from the feed pulse generator 19 and the bight pulse generator 17. The direct current motor 37 for controlling the feed and the direct current motor 43 for controlling the bight are driven thereby, whereby a prescribed feed amount and the bight width are achieved.

When the sixth pulse indicating the final stitch of the pattern P1 is obtained from the feed pulse generator 19 and the bight pulse generator 17, the counters 77 and 55 return to the initial state, whereupon the outputs F1 and Q1 are obtained responsive to the seventh pulse. This is achieved by the presetting function of the switch decoder 53.

In the embodiment shown in FIGS. 11 to 14, the number of divisions of the coordinates for the feed and bight was five. If the number of divisions of the coordinate is selected to be the same for the feed and for the bight, the means for generating the different voltages including the stabilized voltage source can be commonly utilized for both the feed and bight.

Figure 15:
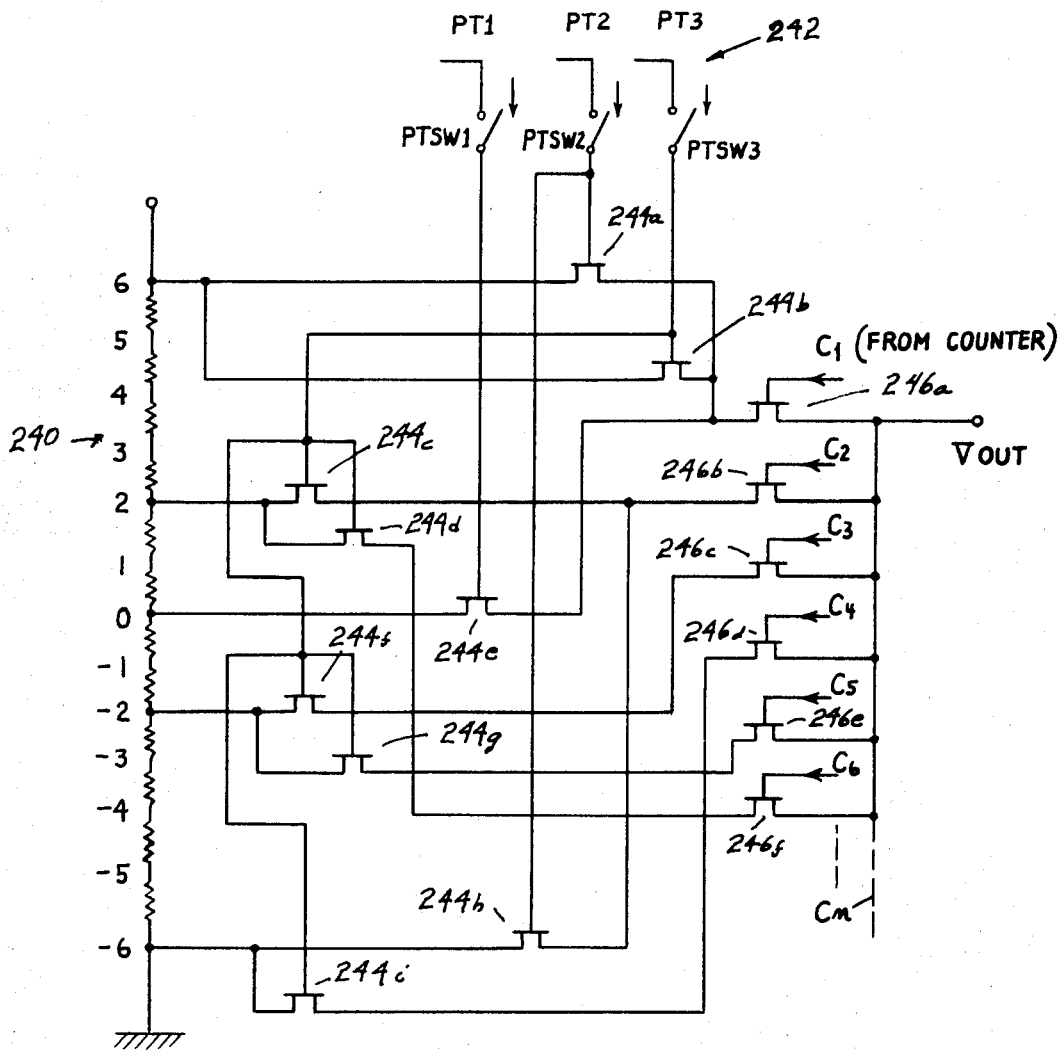
FIG. 15 is a schematic diagram of another embodiment of a circuit which may be employed for the bight resistor network and analog switch of FIG. 2.

FIG. 15 shows an embodiment of a circuit which may be utilized in place of the bight resistor network 57 and analog switch 59 of FIG. 2. A similar circuit may be substituted for the feed resistor network 79 and analog switch 81. In the circuit shown in FIG. 15, a single voltage divider 240 is provided for the various kinds of patterns. The use of a single voltage divider reduces calibration problems with resistors which may exist if a plurality of voltage dividers are employed.

The voltage divider 240 illustrated in FIG. 15 includes twelve serially connected resistors. A stabilized voltage (not shown) is applied to one end of the voltage divider 240 and the other end is grounded. Thus, twelve voltage steps may be obtained.

The embodiment shown in FIG. 15 is adapted to be capable of sewing three patterns, i.e., a straight stitch, PT1, a zigzag stitch PT2, and a mending stitch, PT3. However, other and additional stitch patterns may be provided by coupling to other taps in the voltage divider. One of the three patterns is selected by a pattern selection switch 242. The pattern selection switch comprises three switches, PTSW1, PTSW2 and PTSW3, such that selective operation of any switch by the signal from the switch decoder 53 causes a corresponding pattern selection signal to be provided.

The pattern selection switch is applied to the gates of a plurality of analog switches 244, the number of analog switches being determined by the number of bight coordinate positions in the selected stitch pattern. For example, for the mending stitch PT3, six coordinate positions are required and therefore six analog switches 244 are provided. The gates of the analog switches for the respective stitch patterns are connected in parallel.

The inputs of the analog switches 644 are connected to respective taps on the voltage divider 240 so as to provide at the inputs of the analog switches the desired voltages for the required coordinate positions. The outputs of the analog switches are connected to the inputs of analog switches 246, the gates of which are coupled to the respective outputs of the counter 55. The number of analog switches 246 provided is equal to the number of needle strokes in the selected pattern. In the circuit shown in FIG. 15, six analog switches 246 are provided thereby providing for six needle strokes. The respective inputs of the analog switches 246 are coupled to the output of the analog switch 244 which provides the desired bight voltage for the needle position associated with that analog switch 246. The outputs of the analog switches 246 are connected in parallel to the voltage output which is coupled to the buffer amplifier 61.

In operation, when the desired pattern key on the stitch pattern selector 51 is depressed, the signal is applied to the switch decoder 53. The output signal from the switch decoder 53 is transmitted to the decade counter 55 and the pattern switches 242. The output signal to the counter 55 carries the information on the number of needle strokes for the stitch pattern selected. The pulse signal imparted by the bight pulse generator 17 causes the counter 55 to count the number of stitches as determined by the selected pattern, return to the number one position and repeat the counts.

As shown in FIG. 15, the output signal from the counter 55 is applied as a gate signal to the analog switches 246 progressively and turns them on, one after another. The other output signal from the switch decoder turns on the predetermined switch among the pattern switches 242 and its trigger signal is applied to the gates of the analog switches 244. As the machine rotates, the counter 55 counts the number of needle strokes required for the stitch pattern and the voltages corresponding to the position coordinates of the stitch pattern are taken progressively from the voltage divider 240 through the combination of the analog switches 244 and 246.

Various changes and modifications may be made in the above described apparatus without deviating from the spirit or scope of the present invention. For example, while a voltage divider circuit including resistors is employed for obtaining a plurality of reference voltages, other types of the circuits may be employed. In addition, although direct current motors, a pulse motors or servo-motors are employed as displacement controlling means solenoids may be employed.

Various features of the present invention are set forth in the following claims.

What is claimed is:

1. In a multiple pattern sewing machine, means for controlling the feed amount or bight coordinate position in accordance with the amplitude of the signal applied thereto, means for providing a pattern of signal amplitudes to said controlling means to produce a predetermined feed or bight pattern, said pattern signal providing means including means for supplying a plurality of predetermined signals of different amplitudes, a plurality of means for selectively coupling respective ones of said signal amplitudes to said controlling means, each signal amplitude producing a predetermined coordinate position in said feed or bight pattern, means for generating a timing signal for each stitch in the pattern, and a counter stepped in response to said timing signal and having a maximum count equal to the number of stitches in the pattern, the outputs of said counter being coupled to respective coupling means to thereby actuate the same in an order according to the feed or bight pattern.

2. In a multiple pattern sewing machine, means for controlling the feed amount or bight coordinate position in accordance with the amplitude of a signal applied thereto, means for providing a pattern of signal amplitudes to said controlling means to produce a predetermined feed or bight pattern, said pattern signal providing means including a voltage divider having a plurality of taps for supplying a plurality of predetermined signals of different amplitudes, means for selectively coupling respective ones of said signal amplitudes to said controlling means, each of said selectively coupling means being a switching device coupled between said controlling means and one of said taps, each signal amplitude producing a predetermined coordinate position in said feed or bight pattern, and means for actuating said selectively coupling means in an order according to the feed or bight pattern.

3. A multiple pattern sewing machine, a feed mechanism for feeding a cloth, a bight mechanism for swinging a sewing needle in a direction crossing the cloth feeding direction, means for controlling the displacement of said feed mechanism, means for controlling the displacement of said bight mechanism, means for generating a timing signal for each stitch in the pattern, means for generating a plurality of different reference voltages for controlling said feed mechanism, means for generating a plurality of different reference voltages for controlling said bight mechanism, said feed control reference voltage generating means and said bight control reference voltage generating means each including a voltage divider network formed by a series connection of a plurality of resistor components coupled to receive a predetermined voltage at both ends of said series connection, feed switching means each including a plurality of two serially connected switching devices for selectively coupling said plurality of feed reference voltages to said feed controlling means, bight switching means including a plurality of two serially connected switching devices for selectively coupling said plurality of bight reference voltages to said bight controlling means, pattern selecting means for selectively rendering conductive predetermined ones of said first serially connected switching devices, and counter means responsive to said timing signal for making a stepping operation for selectively rendering conductive said second serially connected switching devices of said feed switching means and said bight switching means for each stepping operation.

4. Apparatus in accordance with claim 2 wherein said actuating means includes means for generating a timing signal for each stitch in the pattern and a counter stepped in response to said timing signal and having a maximum count equal to the number of stitches in the pattern, the outputs of said counter being coupled to respective coupling means to thereby actuate the same.

5. In a multiple pattern sewing machine
   a feed mechanism for feeding a cloth,
   a bight mechanism for swinging a sewing needle in the direction crossing the cloth feeding direction,
   means for controlling the displacement of said feed mechanism,
   means for controlling the displacement of said bight mechanism,
   means for generating a timing signal for each stitch in the pattern,
   means for generating a plurality of different reference voltages for controlling said feed mechanism,
   means for generating a plurality of different reference voltages for controlling said bight mechanism,
   feed switching means including a plurality of switching devices for selectively coupling said plurality of feed reference voltages to said feed controlling means,
   bight switching means including a plurality of switching devices for selectively coupling said plurality of bight reference voltages to said bight controlling means, and
   counter means responsive to said timing signal for making a stepping operation for selectively rendering conductive the switching devices of said feed switching means and said bight switching means for each stepping operation.

6. Apparatus in accordance with claim 5, wherein said timing signal generating means comprises feed timing signal generating means provided for said feed mechanism and bight timing signal generating means provided for said bight mechanism.

7. Apparatus in accordance with claim 5, wherein said counter means comprises
   feed counter means operatively coupled to said feed switching means for selectively rendering conductive the switching devices of said feed switching means, and
   bight counter means operatively coupled to said bight switching means for selectively rendering conductive the switching devices of said bight switching means.

8. Apparatus in accordance with claim 5, wherein said feed control reference voltage generating means and said bight control reference voltage generating means each comprise a voltage divider network including a series connection of a plurality of resistor components coupled to receive a predetermined voltage at both ends of said series connection.

9. Apparatus in accordance with claim 8 wherein said series connection of resistor components is a plurality of resistor elements printed on a single chip.

10. Apparatus in accordance with claim 5, wherein each of said switching devices is a field effect transistor.

11. Apparatus in accordance with claim 5, wherein each of said displacement controlling means includes servo-amplifier means coupled to receive a corresponding control voltage, servo-motor means coupled to be energized by the output of said servo-amplifier means, and position detecting means coupled to said servo-motor means for detecting a rotational position of said servo-motor means for feeding back the output of said servo-amplifier means.

12. Apparatus in accordance with claim 5, wherein each of said displacement control means includes voltage/pulse converting means responsive to a corresponding control voltage for converting said control voltage into a train of pulses the number of which is associated with said control voltage, and pulse motor means coupled to said voltage/pulse converter means to be energized by the pulses from said voltage/pulse converter means.

13. In a multiple pattern sewing machine, including a power source, a driving motor coupled to said power source for energization, a main shaft coupld to be driven by said driving motor, a sewing needle operatively coupled to said main shaft, a feed mechanism operatively coupled to said main shaft for feeding a cloth, a bight mechanism operatively coupled to said main shaft for swinging said sewing needle in the direction crossing the cloth feeding direction, means for controlling displacement of said feed mechanism, and means for controlling the displacement of said bight mechanism, control apparatus comprising: pattern selecting means for selecting a desired one of a plurality of patterns to be sewn;

means operatively associated with the up and down movement of said sewing needle for generating a timing pulse;

a plurality of feed control voltage generating means, one being associated with one of a plurality of patterns to be sewn and being responsive to said pattern selecting means to be selectively enabled for generating a plurality of different voltages for controlling said feed mechanism;

a plurality of bight control reference voltage generating means, one being associated with one of a plurality of patterns to be sewn and being responsive to said pattern selecting means to be selectively enabled for generating a plurality of different reference voltages for controlling said bight mechanism;

feed switching means including a plurality of switching devices for selectively coupling said plurality of feed reference voltages from said selected feed control reference voltage generating means to said feed displacement controlling means;

bight switching means including a plurality of switching devices for selectively coupling said plurality of bight reference voltages from said selected bight control reference voltage generating means to said bight displacement controlling means; and counter means responsive to said timing signal for making a stepping operation for selectively rendering conductive the switching devices of said feed switching means and said bight switching means for each stepping operation.

14. Apparatus in accordance with claim 13, wherein each said switching means comprises a plurality of switching devices the number of which is equal the number of stitches in one cycle of the corresponding pattern to be sewn, each being coupled to a voltage output point of the value corresponding to the coordinate position of each stitch of the corresponding reference voltage generating means.

15. Apparatus in accordance with claim 13, wherein each of said feed control reference voltage generating means and said bight control reference voltage generating means comprises a voltage divider network provided for each of said plurality of patterns to be sewn and including a series connection of a plurality of resistor components coupled to receive a predetermined voltage at both ends of said series connection.

16. A machine in accordance with claim 15, wherein said series connection of resistor components is a plurality of resistor elements printed on a chip.

17. In a multiple pattern sewing machine, including a power source, a driving motor coupled to said power source for energization, a main shaft coupled to be driven by said driving motor, a sewing needle operatively coupled to said main shaft, a feed mechanism operatively coupled to said main shaft for feeding a cloth, a bight mechanism operatively coupled to said main shaft for swinging said sewing needle in the direction crossing the cloth feeding direction, means for controlling displacement of said feed mechanism, and means for controlling the displacement of said bight mechanism control apparatus comprising:

means operatively associated with the movement of said sewing needle for generating a timing signal;

means common to said plurality of patterns to be sewn for generating a plurality of different reference voltages for controlling said feed mechanism;

means common to said plurality of patterns to be sewn for generating a plurality of different reference voltages for controlling said bight mechanism;

feed switching means including a plurality of switching devices for selectively coupling said plurality of feed reference voltages to said feed displacement controlling means;

bight switching means including a plurality of switching devices for selectively coupling said plurality of bight reference voltages to said bight displacement controlling means;

pattern selecting means for selecting a desired one of said plurality of patterns to be sewn, and counter means provided for each of said plurality of patterns to be sewn and responsive to said timing signal for making a stepping operation for selectively rendering conductive the switching devices of said feed switching means and said bight switching means for each stepping operation in association with the selected pattern to be sewn.

18. Apparatus in accordance with claim 17, wherein each said switching means comprises a plurality of switching devices the number of which is associated with the number of stitches in one cycle of the corresponding pattern to be sewn, each being coupled so as to provide a voltage output value corresponding to the coordinate position of each stitch of the corresponding reference voltage generating means.

19. In a multiple pattern sewing machine,
a feed mechanism for feeding a cloth,
means for controlling the displacement of said feed mechanism,
a bight mechanism for swinging said sewing needle in the direction crossing the cloth feeding direction,
means for controlling the displacement of said bight mechanism,
means for generating a timing signal for each stitch in the pattern,
a feed resistor network including a series connection of a plurality of resistor elements adapted to be supplied with a voltage between both ends of said series connection,
a bight resistor network including a series connection of a plurality of resistor elements adapted to be supplied with a voltage between both ends of said series connection,
a matrix including a plurality of column lines and a plurality of sets of row lines, said number of sets of row lines corresponding to the number of reference voltages, the intersections between each column line and said row lines being selectively coupled in a logical product fashion in a step sequence in accordance with one of the multiple patterns,
feed switching means including a plurality of switching devices adapted to be turned on respectively in response to the outputs of the corresponding sets of row lines of said matrix and selectively coupling the reference voltages of said feed resistor network to said feed controlling means,
bight switching means including a plurality of switching devices adapted to be turned on respectively in response to the outputs of the corresponding sets of row lines of said matrix and selectively coupling the reference voltages of said bight resistor network to said bight controlling means, and
counter means responsive to said timing signal for making a stepping operation for selectively and sequentially rendering conductive the sets of row lines in said matrix.

20. Apparatus in accordance with claim 19, wherein said counter means has an output corresponding to the number of needle drops in one cycle of a pattern being sewn.

21. Apparatus in accordance with claim 20, wherein the number of row lines in each set corresponds to the number of needle drops.

22. Apparatus in accordance with claim 19, wherein pattern selecting means is provided for selecting any of said plurality of patterns, and
means responsive to said selection of said pattern selecting means is provided for rendering effective the corresponding column line among said plurality of column lines.

23. Apparatus in accordance with claim 19, wherein each of said resistor networks comprises:
a stabilized voltage source, and
a resistor voltage dividing circuit coupled to said stabilized voltage source for dividing the output of said stabilized voltage source into a plurality of voltage values.

* * * * *

UNITED STATES PATENT AND TRADEMARK OFFICE
CERTIFICATE OF CORRECTION

PATENT NO. : 4,284,016
DATED : August 18, 1981
INVENTOR(S) : Nobuyoshi Matumura

It is certified that error appears in the above—identified patent and that said Letters Patent is hereby corrected as shown below:

Column 3, line 52, change "42" to --43--.

Column 11, line 37, after "feed" insert --step--.
Column 15, line 3, change "_VB" to --+VB--.
Column 15, line 3, change "outer" to --output--.
Column 15, line 22, change ""2∞" to --"2"--.
Column 17, line 40, change "switch" to --stitch--.
Column 17, line 41, change "signal" to --signals--.
Column 17, line 41, change "switch" to --stitch--.
Column 18, line 19, change "switch" to --signal--.
Column 21, line 14, change "of" to --to--.
Column 21, line 27, change "coupld" to --coupled--.

Signed and Sealed this

Twenty-first Day of December 1982

[SEAL]

Attest:

GERALD J. MOSSINGHOFF

Attesting Officer    Commissioner of Patents and Trademarks